(12) United States Patent
Ulichney et al.

(10) Patent No.: US 11,089,180 B2
(45) Date of Patent: Aug. 10, 2021

(54) ENCODING DOT PATTERNS INTO PRINTED IMAGES BASED ON SOURCE PIXEL COLOR

(71) Applicant: Hewlett-Packard Development Company, L.P., Spring, TX (US)

(72) Inventors: Robert Ulichney, Stow, MA (US); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/971,616

(22) PCT Filed: Mar. 20, 2018

(86) PCT No.: PCT/US2018/023340
§ 371 (c)(1),
(2) Date: Aug. 20, 2020

(87) PCT Pub. No.: WO2019/182567
PCT Pub. Date: Sep. 26, 2019

(65) Prior Publication Data
US 2020/0412907 A1 Dec. 31, 2020

(51) Int. Cl.
*H04N 1/32* (2006.01)
*H04N 1/60* (2006.01)
*G06K 15/02* (2006.01)
*H04N 1/405* (2006.01)
*H04N 1/40* (2006.01)

(52) U.S. Cl.
CPC ..... *H04N 1/32219* (2013.01); *G06K 15/1881* (2013.01); *G06K 15/1892* (2013.01); *H04N 1/32208* (2013.01); *H04N 1/32251* (2013.01); *H04N 1/32256* (2013.01); *H04N 1/32309* (2013.01); *H04N 1/32352* (2013.01); *H04N 1/4055* (2013.01); *H04N 1/40062* (2013.01); *H04N 1/60* (2013.01)

(58) Field of Classification Search
None
See application file for complete search history.

(56) References Cited

U.S. PATENT DOCUMENTS 5,323,245 A   6/1994  Rylander
5,946,414 A * 8/1999  Cass .................... G06T 1/0021
                                                    382/183
(Continued)

FOREIGN PATENT DOCUMENTS

EP        0789480       8/1997

*Primary Examiner* — Ted W Barnes
(74) *Attorney, Agent, or Firm* — HP Inc. Patent Department

(57) ABSTRACT

In an example method, a set of source pixels corresponding to an image to be printed and a dot pattern of pixels including information to be encoded across the image are received. The dot pattern of pixels is mapped to a corresponding subset of the source pixels. A value of a clipping channel color in the subset of the source pixels is modified based on an original value of the clipping channel color for each pixel in the subset. The clipping channel color is used to detect the dot pattern of pixels. The image including the subset of pixels with modified clipping channel colors is printed.

20 Claims, 17 Drawing Sheets
(7 of 17 Drawing Sheet(s) Filed in Color)

(56) References Cited

U.S. PATENT DOCUMENTS

| | | | |
|---|---|---|---|
| 6,738,491 B1* | 5/2004 | Ikenoue | G06T 1/0021 283/901 |
| 7,027,189 B2 | 4/2006 | Umeda | |
| 7,028,902 B2* | 4/2006 | Xu | G06K 7/14 235/462.01 |
| 7,149,451 B2 | 12/2006 | Uchida et al. | |
| 7,234,645 B2 | 6/2007 | Silverbrook et al. | |
| 7,385,730 B2* | 6/2008 | Ogasahara | B41J 2/2056 358/1.8 |
| 7,609,851 B2 | 10/2009 | Guan et al. | |
| 7,783,073 B2 | 8/2010 | Asano | |
| 7,864,979 B2 | 1/2011 | Fan et al. | |
| 7,911,653 B2 | 3/2011 | Saito | |
| RE42,473 E | 6/2011 | Gorian et al. | |
| 8,014,035 B2 | 9/2011 | Monga et al. | |
| 8,100,330 B2* | 1/2012 | Bulan | G06K 7/10 235/462.04 |
| 8,189,235 B2 | 5/2012 | Matsuzaki | |
| 8,335,014 B2 | 12/2012 | Muramatsu | |
| 8,599,457 B2 | 12/2013 | Iwamoto | |
| 9,344,600 B2 | 5/2016 | Chen et al. | |
| 2004/0148261 A1 | 7/2004 | Abe | |
| 2005/0259280 A1* | 11/2005 | Rozzi | H04N 1/4055 358/1.9 |
| 2006/0072778 A1* | 4/2006 | Harrington | H04N 1/32203 382/100 |
| 2006/0072781 A1* | 4/2006 | Harrington | H04N 1/32309 382/100 |
| 2008/0080009 A1 | 4/2008 | Masui et al. | |
| 2008/0292129 A1 | 11/2008 | Fan et al. | |
| 2010/0040282 A1 | 2/2010 | Bala et al. | |
| 2010/0214577 A1* | 8/2010 | Owen | H04N 1/6016 358/1.9 |
| 2011/0102847 A1 | 5/2011 | Wang et al. | |
| 2013/0063568 A1 | 3/2013 | Silverbrook | |
| 2015/0009410 A1* | 1/2015 | Ikushima | H04N 5/40 348/724 |
| 2015/0371124 A1* | 12/2015 | Okumura | G06K 15/1878 358/1.9 |
| 2016/0364825 A1* | 12/2016 | Pan | G06T 1/0028 |
| 2017/0154399 A1* | 6/2017 | Oliveira da Silva | G06T 1/0028 |
| 2018/0189605 A1* | 7/2018 | Wu | G06K 19/16 |

* cited by examiner

400

500

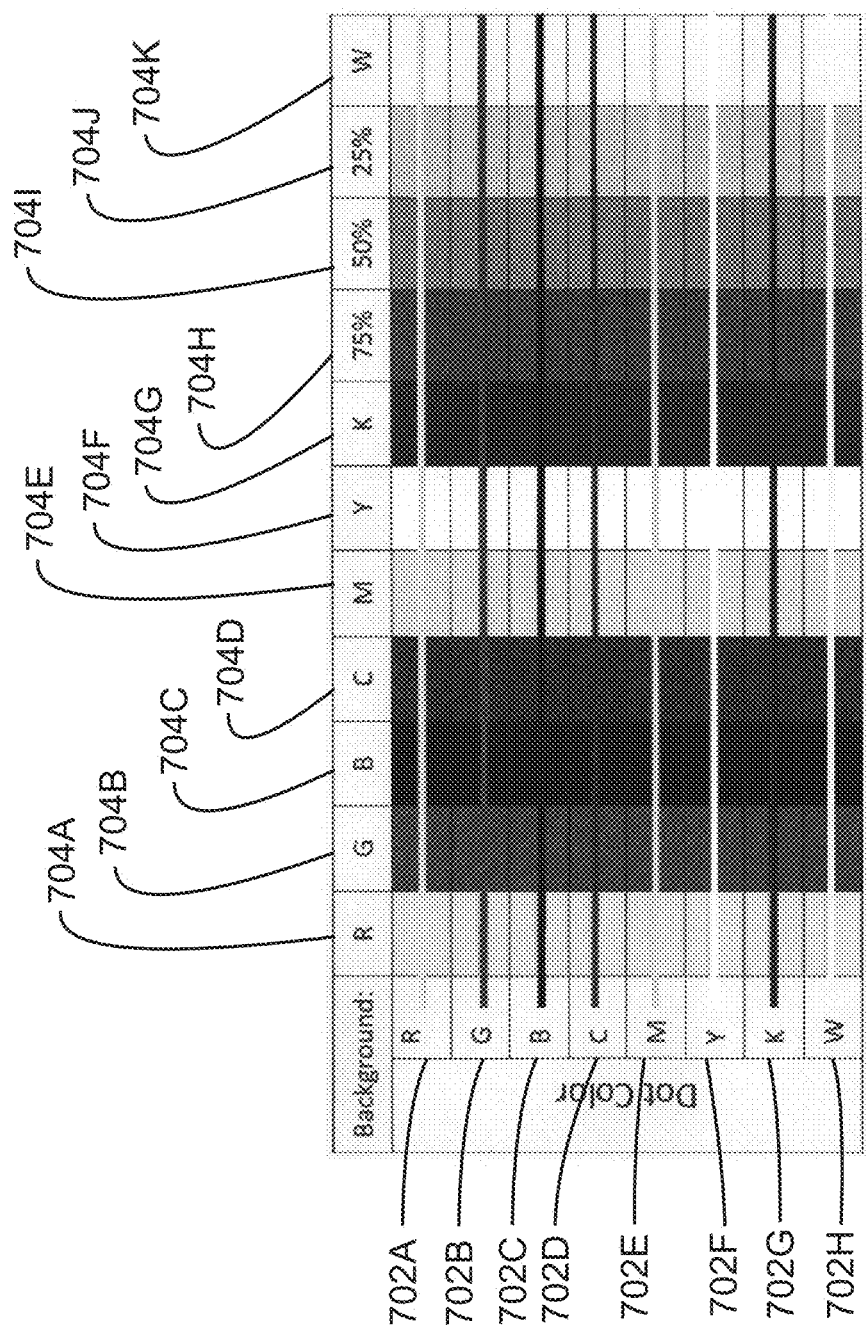

700B

900A

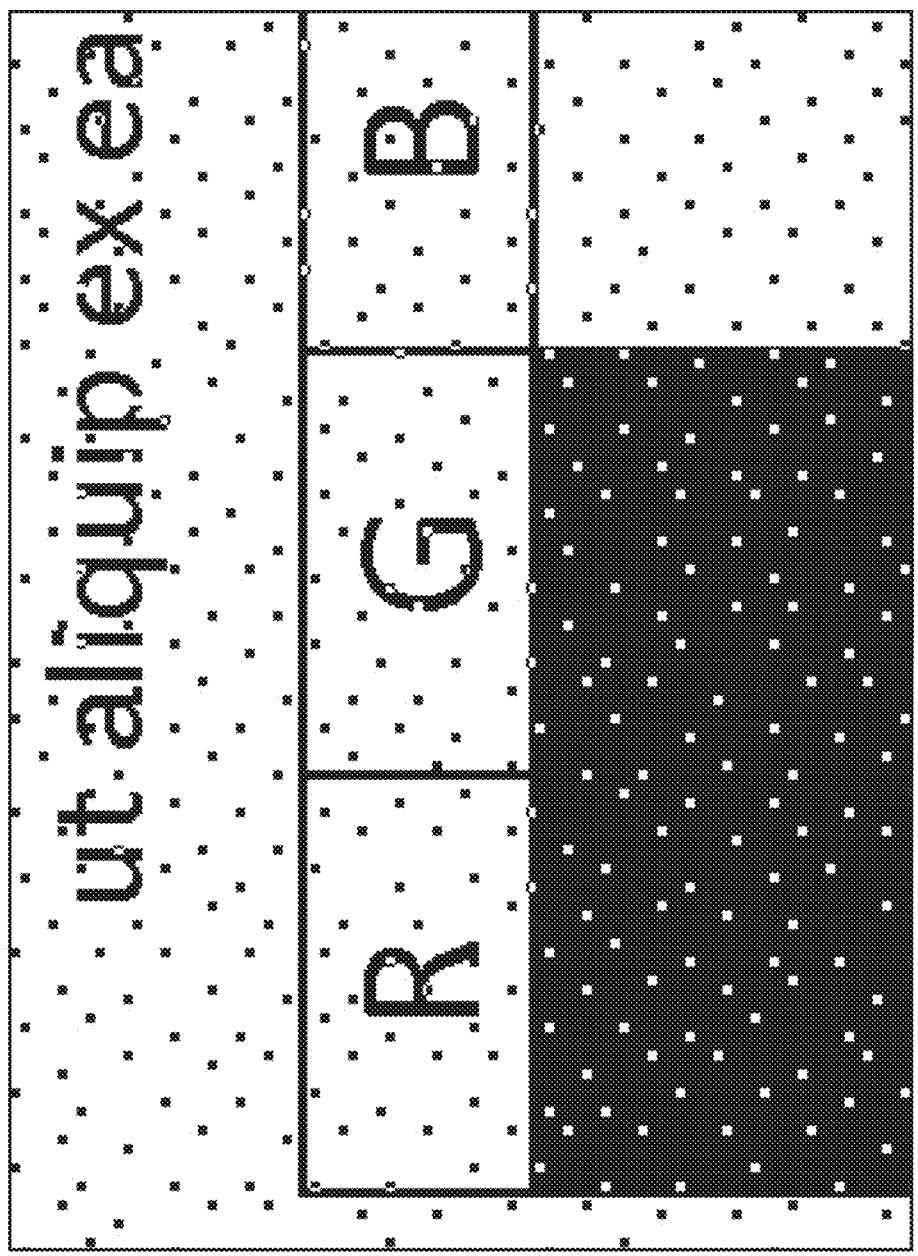

ENCODING DOT PATTERNS INTO PRINTED IMAGES BASED ON SOURCE PIXEL COLOR

CROSS-REFERENCE TO RELATED APPLICATION

Pursuant to 35 U.S.C. § 371, this application is a United States National Stage Application of PCT Patent Application Serial No. PCT/US2018/023340, filed on Mar. 20, 2018, the contents of which are incorporated by reference as if set forth in their entirety herein.

BACKGROUND

Dot patterns are used to encode information into printed images. For example, the dot pattern may encode information about when and where the document was printed, and who printed it.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features of the techniques of the present application will become apparent from the following description of examples, given by way of example only, which is made with reference to the accompanying drawings, of which:

FIG. 7A is a black and white image representing an example red channel of an example scanned printed test chart;

FIG. 9C is a black and white image representing an example blue channel of an example printed and scanned image encoded with a dot pattern of multiple colors;

DETAILED DESCRIPTION

Dot patterns may be used to encode information into printed documents. For example, yellow dot patterns may be used to encode information on documents with minimal visual distraction. As used herein, a dot pattern refers to a pattern of printed ink in which a relative position of dots is used to encode information. The dot pattern of yellow dots may be printed on a sheet of paper to indicate the time, date, and serial number of the printer, among other information. A blue channel may then be used to recover the yellow dot pattern. While yellow dots can be recovered when printed on a white background, they are not always recoverable when printed on backgrounds of other colors. For example, documents having lots of yellow or any yellow at all may result in a substantial portion of encoded information being undetectable.

Described herein are techniques for encoding dot patterns into printed documents, based on source pixel color. A digital document can be described as an image, since it is comprised of an array of pixels. An image, as used herein, may include any combination of text, graphics, white, space, and photos. In one implementation, the color of each of the dots in the dot pattern as printed out in an image may be based on an original color of the source page pixel being replaced. In some examples, the dot pattern may be used to deter copying and trace an origin of copied documents. In some examples, the visibility and detectability of candidate dot colors across a range of backgrounds may be evaluated using test patterns described below. In some examples, suitable candidate dot colors may then be included in a lookup table to be used to replace source page pixels. Thus, the techniques described herein provide a flexible means for defining dot color and background color combinations. Furthermore, the techniques described herein may minimize impact to visual appearance of an image with an embedded dot pattern using a method for single color channel clipping by only changing the dot color in the color channel used in recovery. The techniques described herein thus allow single channel detectability for the entire document while minimizing visibility of the dots in the pattern. Moreover, the techniques described herein may use existing printing processes and inks to encode a dot pattern that may be recovered regardless of the content on the page. For example, the page content may be empty white space, text, solid areas with various colors, or even more complex graphic patterns.

Figure 1:
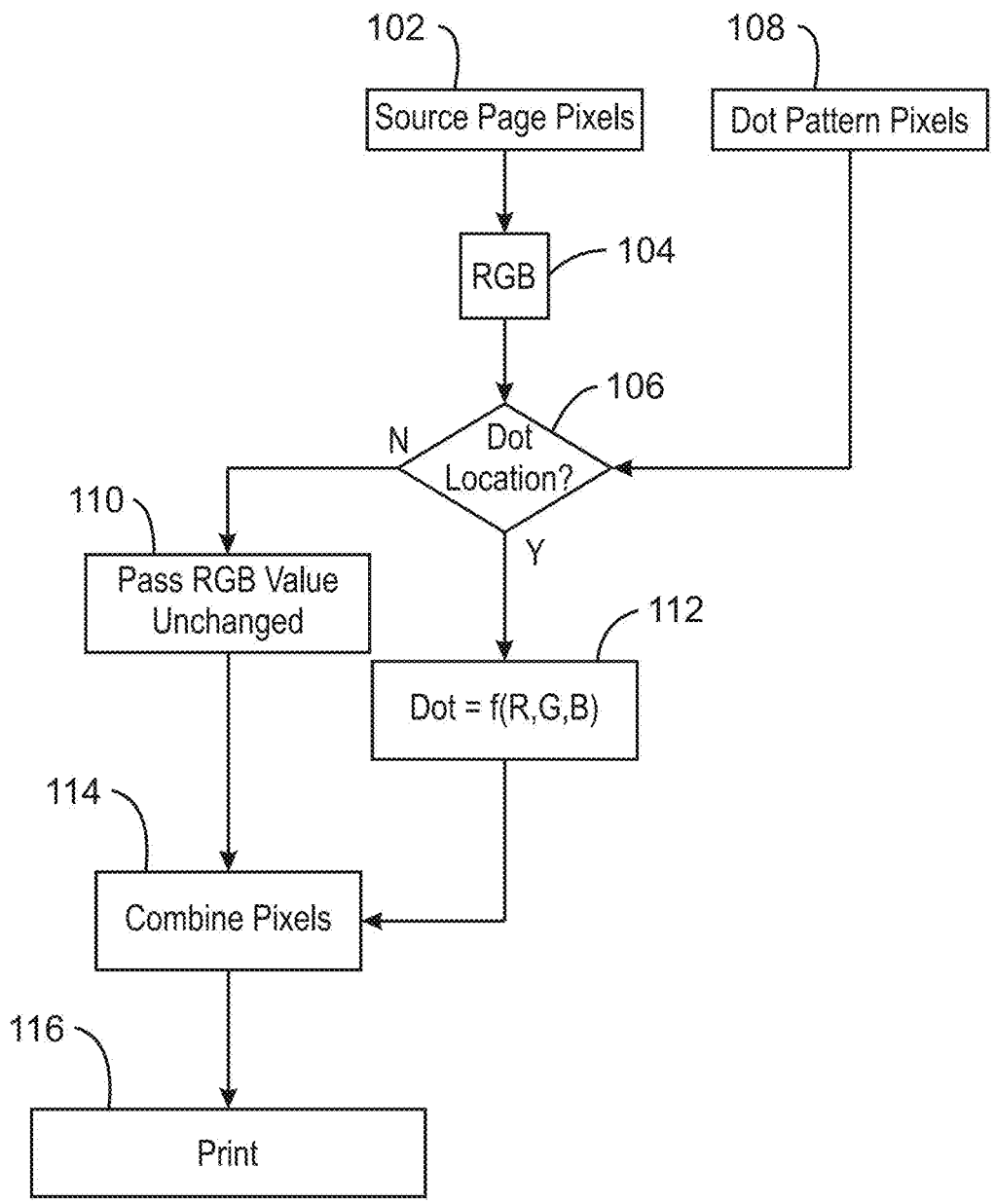
FIG. 1 is a schematic diagram illustrating an example method for encoding dot patterns into printed images based on source pixel color.

FIG. 1 is a schematic diagram illustrating an example method 100 for encoding dot patterns into printed images based on source pixel color. The method 100 of FIG. 1 may be implemented in the computing device 1202 of FIG. 12 below or example machine-readable storage medium 1300 of FIG. 13 below. For example, the method may be implemented using processor 1202 or the processor 1302.

The example method 100 includes receiving a set of source page pixels 102. For example, the set of source page pixels 102 may correspond to an image or a document. In some examples, the image or document may be color or black and white.

The method 100 further includes separating the source page pixels into red, green, and blue (RGB) values 104. For example, a red, green, and blue (RGB) value may be retrieved for each of the source page pixels. In examples where the image or document is black and white, the source page may be represented with a different set of color space values, such as single-channel intensity values.

At decision diamond 106, a determination is made as to whether each of the source page pixels corresponds to a dot location. If a source page pixel does not correspond to a dot location, then the method 100 may continue at block 110. If the source page pixel does correspond to a dot location, then the method 100 may continue at block 114.

The method 100 includes receiving a set of dot pattern pixels 108. For example, the set of dot pattern pixels 108 may encode information. In some examples, the encoded information may be information about a printer, a date, time of printing, etc.

At block 110, the RGB values of one or more source page pixels are passed unchanged to a printer for printing. For example, the RGB values may be printed as described in block 114 below.

At block 112, an RGB value for each of the source pixels corresponding to a dot location is modified based on the RGB values of each source pixel. The RGB value may be modified using any suitable function or procedure, such as a lookup table as described below.

At block 114, the pixels from blocks 110 and 112 are combined. For example, the pixels may be combined to form an updated image to be printed.

At block 116, the received RGB values are printed. For example, the RGB values may be printed onto a white sheet of paper or any other suitable medium.

It is to be understood that the process diagram of FIG. 1 is not intended to indicate that all of the elements of the method 100 are to be included in every case. Further, any number of additional elements not shown in FIG. 1 may be included in the method 100, depending on the details of the specific implementation. For example, the method may include a separation of the RGB values into individual color channel values, and separate processing for each of the RGB color channel values of the source page pixels as described in FIGS. 2 and 3 below.

Figure 2:
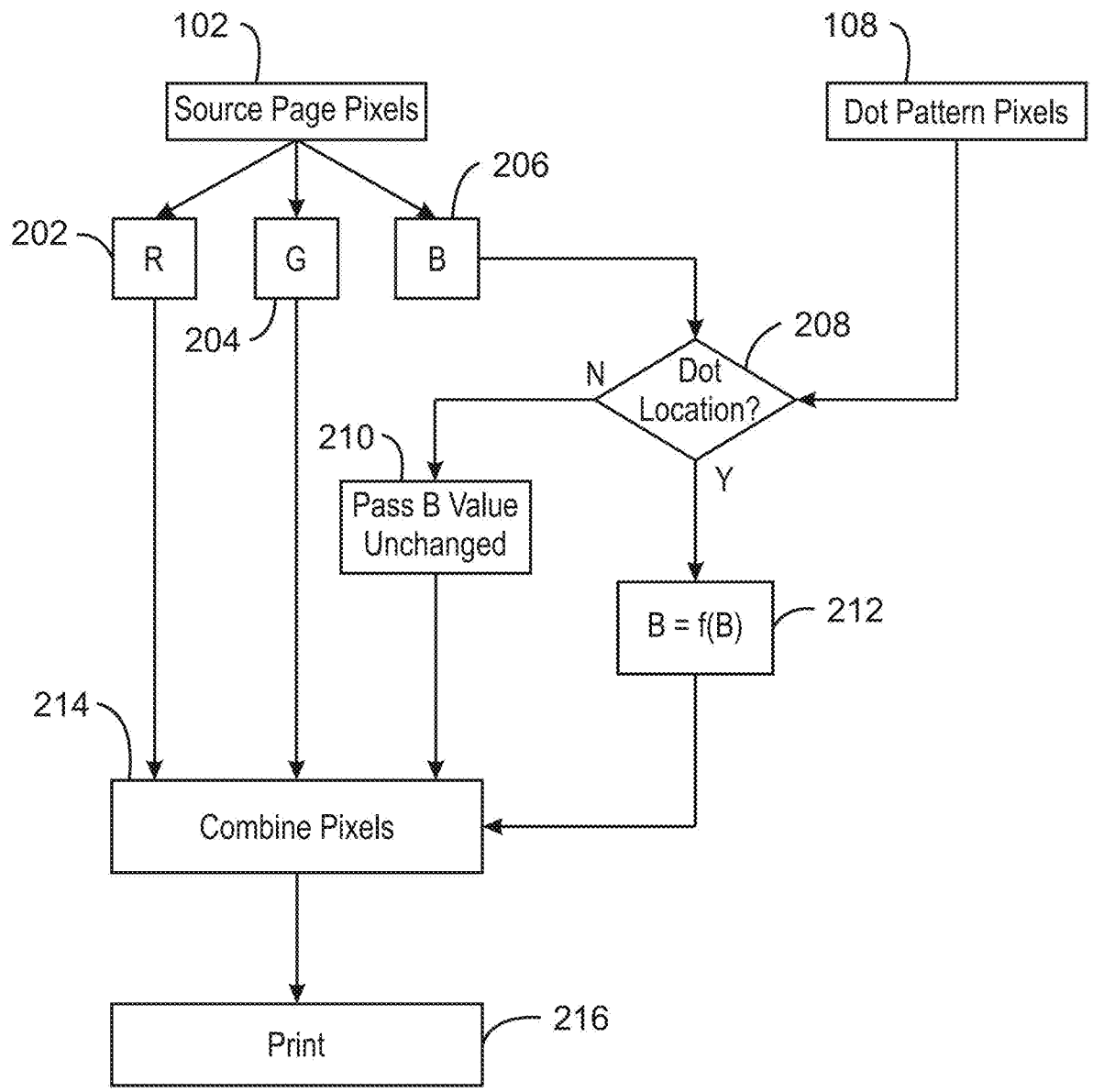
FIG. 2 is a schematic diagram illustrating an example method for encoding dot patterns into printed images based on blue pixel colors.

FIG. 2 is a schematic diagram illustrating an example method for encoding dot patterns into printed images based on blue pixel colors. Although the example of FIG. 2 is shown based on blue pixel colors, in some example, the processing described for the blue pixels colors may also be based on red pixel color, green pixel color, or any combinations thereof. The method 200 of FIG. 2 is may be implemented in the computing device 1202 of FIG. 12 below or example machine-readable storage medium 1300 of FIG. 13 below. For example, the method may be implemented using processor 1202 or the processor 1302.

FIG. 2 includes similarly numbered elements from FIG. 1. For example, the method 200 may include receiving a set of source page pixels 102 and dot pattern pixels 108.

As described with respect to FIG. 1, the method 200 includes separating a red channel 202 including red pixels from the blue and green pixels of the source page pixels 102. Higher values in the red channel 202 may indicate higher amounts of red in a pixel while lower values in the red channel may indicate lower amounts of the color red in a pixel.

The method 200 includes separating a green channel 204 including the green pixels of the source page pixels from the red and blue pixels and into a separate set or channel of pixels. For example, higher values in the green channel 204 may indicate higher amounts of green in a pixel while lower values in the green channel may indicate lower amounts of the color green in a pixel.

The method 200 includes separating a blue channel 206 including the blue pixels of the source page pixels from the red and green pixels and into a separate set or channel of pixels. For example, higher values in the blue channel may indicate higher amounts of blue in a pixel while lower values in the blue channel may indicate lower amounts of the color blue in a pixel.

At decision diamond 208, a determination is made as to whether each of the blue source page pixels corresponds to a dot location. A dot location, as used herein, refers to the location of a dot in a dot pattern placed onto a source page. For example, the dot pattern may be an image the same size as the document, with mostly white space. The dot locations may be locations in the dot pattern image where that image is not white and will correspond to locations in the document as tested by decision diamond 208. If a blue source page pixel does not correspond to a dot location, then the method may continue at block 210. If the blue source page pixel does correspond to a dot location in the dot pattern pixels 108, then the method may continue at block 212. Otherwise, at block 210, the value of the blue source page pixel is passed unchanged. For example, the source page pixel may then be printed without any modification.

At block 212, the values of the blue source page pixels are modified based on the original value of the value source page pixels. For example, blue source page pixels having an original value below or equal to a threshold value may be set to a maximum value. The maximum value may be one or any other value representing a maximum value for a color component. In some examples, blue source page pixels having an original value above the threshold value may be set to a minimum value, such as zero. In some examples, the adjusted blue value may be combined with the original red and green pixel values for printing.

At block 214, the pixels are combined. For example, the pixels from the red channel 202 and green channel 204 may be combined with the blue pixels from blocks 210 and 212 to form an updated color image for printing.

At block 216, the pixels are printed. For example, the red source pixels, green source pixels, and at least partially modified blue source pixels may be printed onto any suitable medium such as white paper. Thus, in the example of FIG. 2, the red and green components of the source page pixels may be passed without modification regardless of the location in the image.

It is to be understood that the process diagram of FIG. 2 is not intended to indicate that all of the elements of the method 200 are to be included in every case. Further, any number of additional elements not shown in FIG. 2 may be included in the method 200, depending on the details of the specific implementation. While the method 200 is shown in this example as only operating on the blue channel only, the same method may be used with the red channel only, or the green channel only. In some examples, a conversion from RGB to perceived luminance, L, may be performed using the equation:

$$L = 0.299R + 0.587G + 0.114B \qquad \text{Eq. 1}$$

Eq. 1 reflects how human vision weights red (R), green (G), and blue (B) wavelengths. This weighting means that blue appears 19.4% as bright as green, and red appears 50.9% as bright as green. Thus, in some examples, if appearance is a factor to be considered, then blue channel clipping may be used. In some examples, if appearance is not a factor, then red or green channel clipping may allow dot pattern detection just as well as the blue channel clipping. Thus, in some examples, the method 200 may also include processing of the red and green source pixels as described for the blue source pixels in blocks of 208-212. The method 200 may thus be applied to all three channels, red, green, and blue, to generate a highly detectable printed image. In this example, the channel processing portion in blocks of 208-212 that was applied to the blue channel only may be applied to the red, green and blue channels for every pixel.

Figure 3:
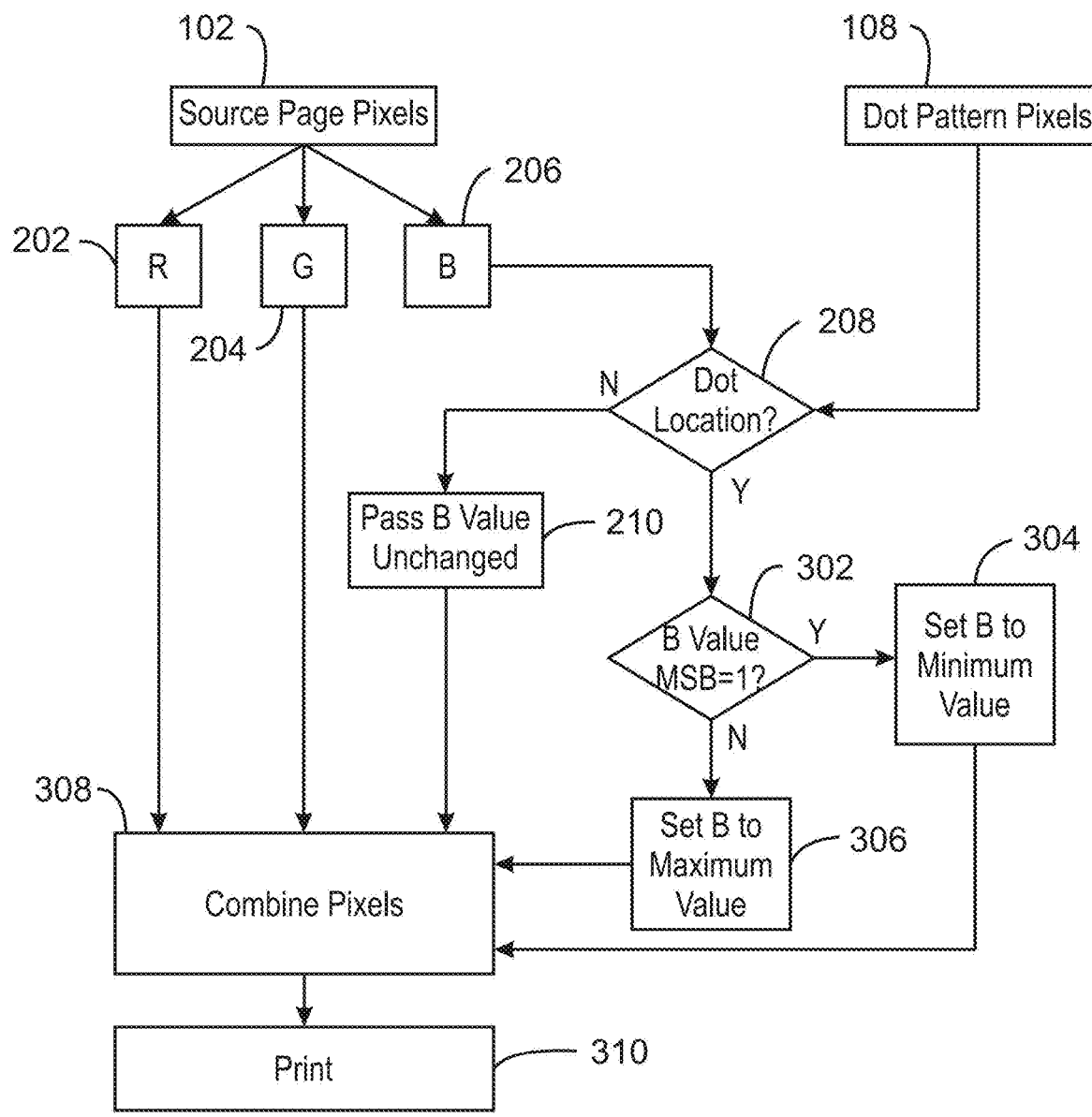
FIG. 3 is a schematic diagram illustrating another example method for encoding dot patterns into printed images based on blue pixel colors.

FIG. 3 is a schematic diagram illustrating another example method for encoding dot patterns into printed images based on blue pixel colors. Although described in the example of FIG. 3 using blue pixel colors, the processing described for the blue pixels colors may also be based on red pixel color, green pixel color, or any combinations thereof. The method 300 of FIG. 3 may be implemented in the computing device 1202 of FIG. 12 below or example machine-readable storage medium 1300 of FIG. 13 below. For example, the method may be implemented using processor 1202 or the processor 1302.

FIG. 3 includes similarly numbered elements from FIGS. 1 and 2. For example, the method 200 may include receiving a set of source page pixels 102 and dot pattern pixels 108 as described above in FIG. 1. Similarly, a red channel 202, green channel 204, and blue channel 206 may be separated from the source page pixels 102 as described in FIG. 2 above.

At decision diamond 302, a determination is made as to whether the blue component of each of the source page pixels that corresponds to a dot location has a most significant bit value of one. In some examples, this determination may be a computationally efficient test of whether the source blue component is greater than a 50% threshold. If the blue component of the source page pixel does have a most significant bit value of one, then the method may continue at block 304. If the blue component is larger than half its maximum value, then the blue component may be set to zero. If a blue component of the source page pixel does not have a most significant bit (MSB) value of one, then the method may continue at block 306. For example, if the MSB is 0 then the blue component of the source page pixel may be set to the maximum value as describe below. For the common case of representing the magnitude of color components with 8-bit values, the maximum value may be 255.

At block 304, the value of the blue component of the source pixel is set to a minimum value. For example, a minimum value for the pixels may be zero.

At block 306, the value of the blue component of the source pixel is set to a maximum value. For example, the maximum value may be 255. In some examples, the maximum value may be one.

At block 308, the pixels are combined. The source pixel red component 202 and green component 204 may be combined with the blue components of the pixels from blocks 210, 304 and 306 to form an updated image for printing.

At block 310, the pixels are printed. The red component values 202, green component values 204, and blue component values 304 or 306 for each pixel may be combined and printed onto any suitable medium, such as a white sheet of paper.

It is to be understood that the process diagram of FIG. 3 is not intended to indicate that all of the elements of the method 300 are to be included in every case. Further, any number of additional elements not shown in FIG. 3 may be included in the method 300, depending on the details of the specific implementation. For example, while the method 200 operates on the blue channel only, the same method may be used to operate on red channel only, or the green channel only. In some examples, the method may also include processing of the red and green components of the source pixels as described for the blue components of the source pixels in blocks 208, 210 and 302-306.

Figure 4:
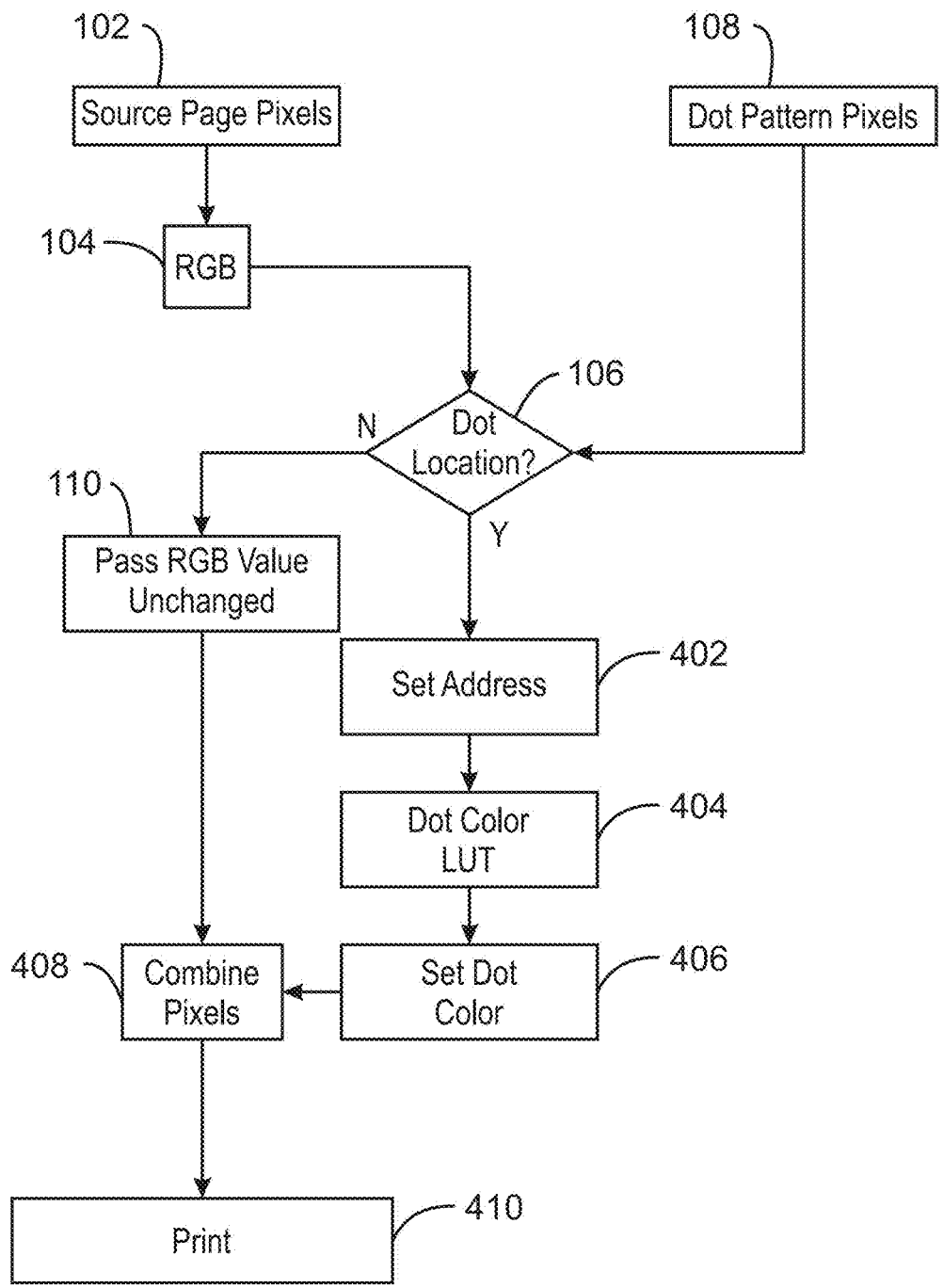
FIG. 4 is a schematic diagram illustrating an example method for encoding dot patterns using a lookup table.

FIG. 4 is a schematic diagram illustrating an example method 400 for encoding dot patterns using a lookup table. The example method 400 of FIG. 4 may be implemented in the computing device 1202 of FIG. 12 below or example machine-readable storage medium 1300 of FIG. 13 below. For example, the method 400 may be implemented using processor 1202 or the processor 1302.

The method 400 of FIG. 4 includes similarly numbered elements from FIG. 1. For example, the set of source page pixels 102 and dot pattern pixels 108 may be received, RGB channels 104 separated from the source page pixels 102, a dot location determination 106 performed, and RGB values not in dot locations passed unchanged 110, as described above in FIG. 1. However, in the method 400 of FIG. 4, if the source page pixel does correspond to a dot location, then the method 100 may continue at block 402.

At block 402, an address is set based on the RGB value 104. For example, the address may be a color component representation of the RGB. In some examples, the color component representation may be a three-bit RGB MSB. For example, a 3-bit index is formed using the most significant bits, respectively, from the R, G, and B components of each source page pixel. For example, the three-bit RGB MSB may be generated using the color space cube described with respect to FIG. 5.

Figure 6:
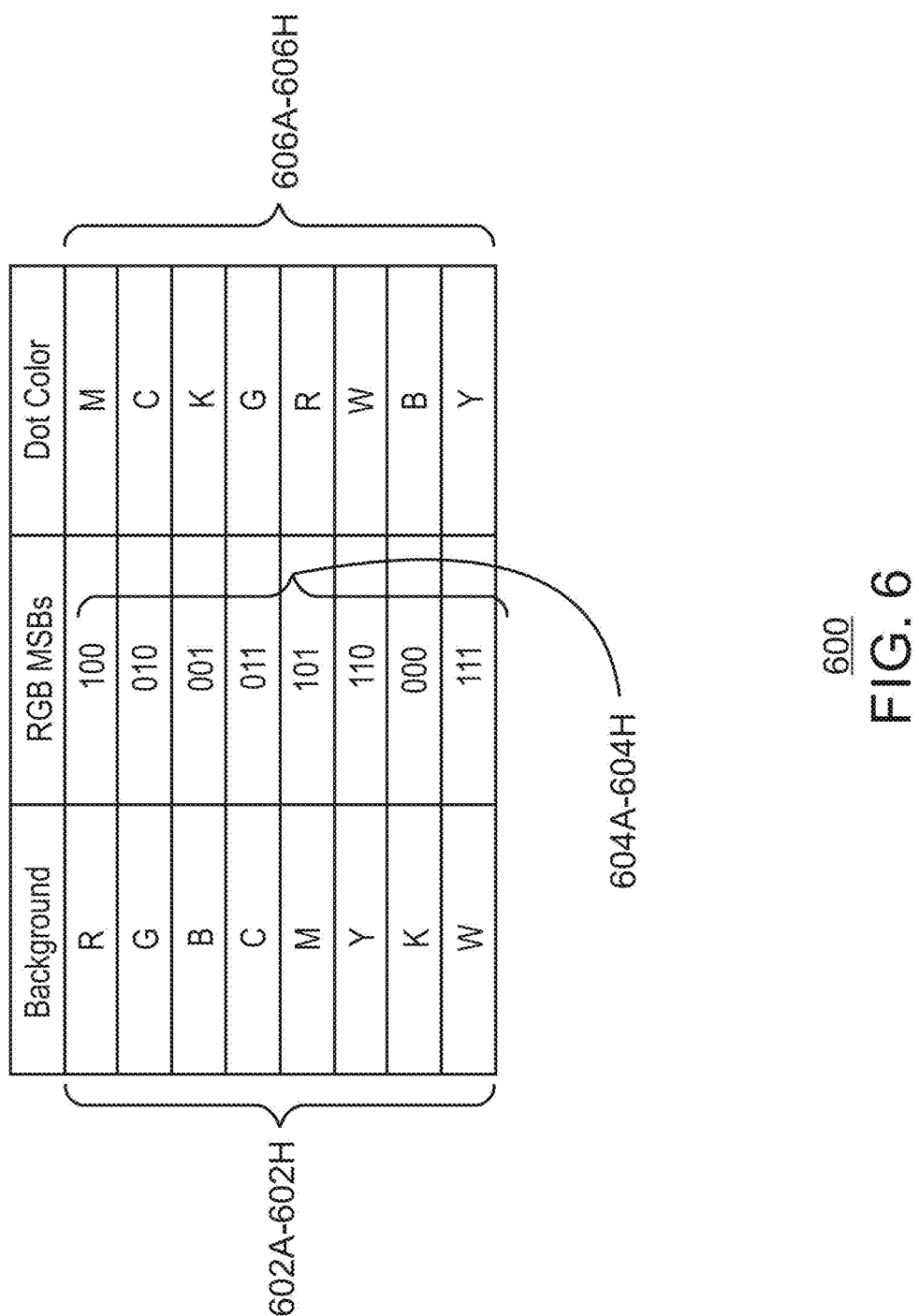
FIG. 6 is a chart of an example of a dot color lookup table for process inks and solid colors.

The set address may then be sent in a query to a dot color lookup table (LUT) 404 to determine a replacement dot color for a given address. For example, given a particular color component representation, such as a three-bit RGB MSB, a corresponding dot color may be selected to replace the underlying color in the source page. In some examples, the 3 bits are used to address the dot color lookup table (LUT) 404. An example dot color LUT 404 is shown in FIG. 6 below.

At block 406, the dot color is set. For example, the dot color may replace the corresponding source page pixel at the dot location. In some examples, process color inks, including cyan (C), magenta (M), yellow (Y), and black (K), may be used as possible dot colors. For example, given that the dot pattern is to be printed on a white (W) background, yellow (Y) may be selected as the dot color for low visibility. A blue clipping channel may also then be used for detection. In some examples, dot colors may be selected from the set C, M, Y, K, and W for the other backgrounds based on low visibility and high detectability in the blue channel after examining a test chart. For example, the test chart in FIG. 7C may be used to select dot colors for a pattern to be detected using a blue clipping channel.

At block 408, pixels are combined. For example, the pixels from the set dot colors 406 may be combined with the pixels from the unchanged RGB values at block 110 to generate a new image to be printed.

At block 410, the passed RGB values from block 110 and the set dot colors from block 406 are printed. For example, the passed RGB values from block 110 and the set dot colors from block 406 may be combined and printed onto any suitable medium, such as a white sheet of paper.

Figure 5:
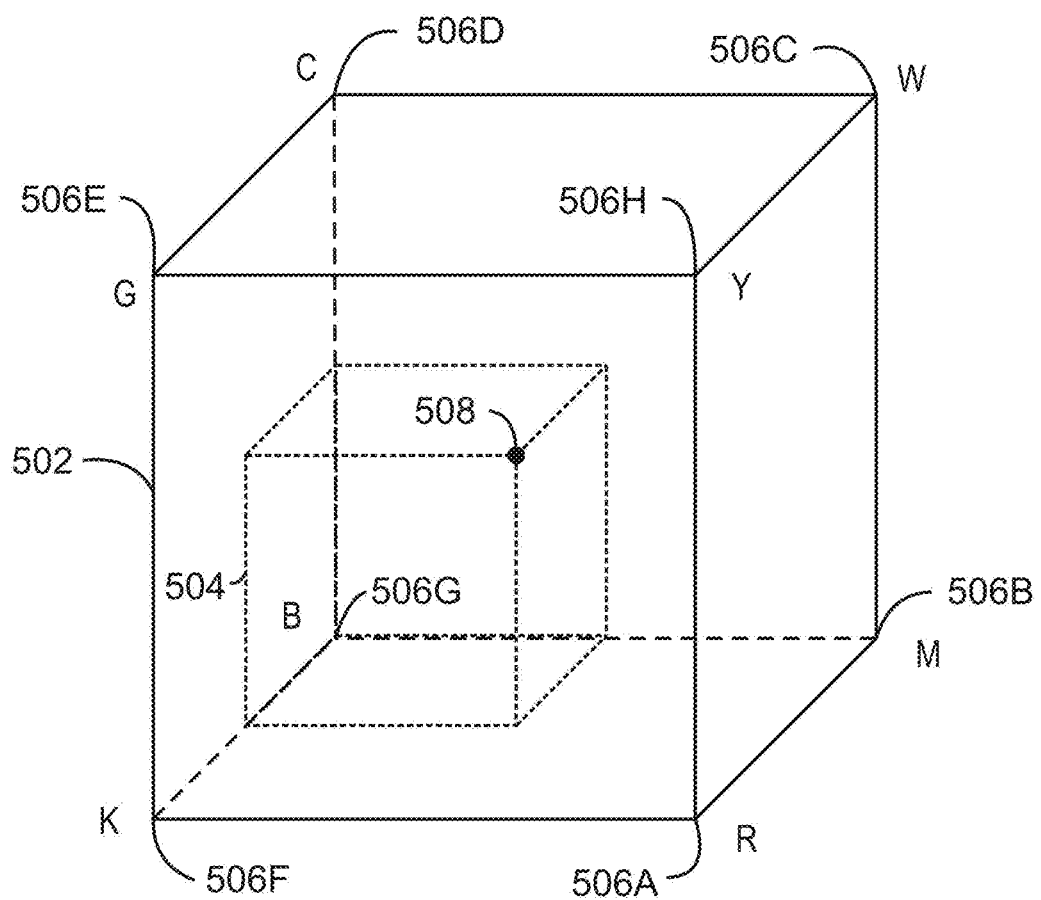
FIG. 5 is a drawing of an example RGB color space with a blue corner subset that may be represented as three bits.

FIG. 5 is a drawing of an example RGB color space 300 with a blue corner subset that may be represented as three bits. The example RGB color space 300 of FIG. 3 may be implemented in the computing device 1202 of FIG. 12 below or example machine-readable storage medium 1300 of FIG. 13 below. While the example described in FIG. 5 operates in and takes advantage of the fact that it uses the RGB color space, it is to be appreciated that the techniques described herein may be applied in other color spaces or ink spaces.

As shown in FIG. 5, a three-dimensional color space may be defined using a color space cube 502. The color space cube 502 may include eight subsets includes a blue subset cube 504. The $2^{24}$ background colors of a color space may be grouped in eight subsets, one for each corner color associated with a vertex of the color space cube 502. The eight subsets may be formed by slicing the color space cube 502 along the mid points of the R, G, and B axes resulting in eight smaller cubes. The color space cube 502 of FIG. 5 includes vertices 502A-502H, representing red (R), magenta (M), white (W), cyan (C), green (G), black (K), blue (B), and yellow (Y), respectively. A center 508 of the color space cube 502 representing a middle gray also serves as a vertex for the blue subset cube 504, as well as the other seven subset cubes corresponding to vertices 506A-F and 506H. Each of the eight smaller cubes thus may have one vertex at a corner of the RGB cube where the opposite vertex is the middle-gray point 208 in the center of the RGB cube.

A color within an RGB color space may be converted into a three-bit value of most significant bytes (MSBs), one for each red, green and blue component, using the color space cube 502. Received original color image pixel representations may use 8 bits each for R, G, and B. There may be over 16 million background colors in the RGB color space. Using techniques described herein, a color that falls within the blue sub cube 504 having eight bit values for each of R, G, and B channels may be converted into a three bit value of 001. Thus, all of the background colors that fall into the subset cube 504 may accommodate a dot color as selected for solid blue. Using this sub-grouping, all background colors may be represented by only 3 bits, one for each color component R, G, and B. Each different three-bit combination may be associated with a different octant of the RGB cube. An example set of MSBs corresponding to a set of process ink and solid colors is shown in FIG. 6 below. As described in greater detail below, the three-bit values may be used as index values in a lookup table to determine a dot color to be used to replace a source pixel with a given color corresponding to a three bit value. An 8-element look up table (LUT) may be addressed by these three bits.

FIG. 6 is a chart of an example of a dot color lookup table 600 for process inks and solid colors. The example lookup table 600 of FIG. 6 may be used by the computing device 1202 of FIG. 12 below or example machine-readable storage medium 1300 of FIG. 13 below.

The lookup table 600 includes a set of background color values 602A-602H, including red (R), green (G), blue (B), cyan (C), magenta (M), yellow (Y), black (K), and white (W), respectively. In some examples, the dot colors may only use CYMKW process inks or RGB rather than a combination of both CYMKW and RGB solid colors.

The lookup table 600 also includes a corresponding set of three-bit RGB most significant bit (MSB) values 604A-604H. The RGB MSBs of the color red 602A are 100. The RGB MSBs of the color white are 111. The lookup table 600 further includes a set of associated dot colors 606A-606H. The background color red 602A of the example lookup table 600 is associated with the dot color magenta 606A.

In some examples, a background color may be received and associated with the colors 602A-602H using the color space cube described in FIG. 5 above. For example, a color pixel falling within the color space of a red subset cube may be assigned to the color red and have a corresponding RGB MSB of 100. In some examples, the color may be replaced with magenta 606A in response to detecting that the color pixel is located in a dot location of a dot pattern to be encoded into a picture, as described in FIG. 1 above and FIG. 10 below.

FIG. 7A is a black and white image representing an example red channel of an example scanned printed test chart. The example scanned and printed test chart 700A of FIG. 7A may be used by the computing device 1202 of FIG. 12 below or example machine-readable storage medium 1300 of FIG. 13 below. The test chart may be used to select dot colors to replace background colors given a red clipping channel.

As shown in FIG. 7A, the example test chart 700A includes a set of dot colors 702A-702H corresponding to red (R), green (G), blue (B), cyan (C), magenta (M), yellow (Y), black (K), and white (W), respectively. The set of dot colors 702A-702H may represent colors that may be generated without half-toning using solid process colors cyan (C), magenta (M), yellow (Y), and black (K). The dot colors red (R) 702A, green (G) 702B, and blue (B) 702C may be rendered with combinations of these solid inks. For example, R=M+Y, G=C+Y, and B=C+M. In some examples, white (W) may be the absence of any ink, and may thus represent paper white. The example test chart 700A also includes a set of background colors 704A-704K, corresponding to red (R), green (G), blue (B), cyan (C), magenta (M), yellow (Y), and white (W). The background colors may represent the corners of the RGB color space cube of FIG. 5 above. The set of background colors also include 75% gray (75%), 50% gray (50%), and 25% gray (25%).

The example test chart 700A may be used to select dot colors given any number of background colors and a red color clipping channel. Given a background color of green 704B, the corresponding dot color that may be selected for maximum detection may be red 702A, magenta 702E, yellow 702F, or white 702H. In some examples, the original color scan (not shown) may also be analyzed to choose from red 702A, magenta 702E, yellow 702F, or white 702H to select a color that both minimizes visual appearance while maximizing detection performance. The color red 702A or magenta 702E may be chosen as a dot color that has both good detection performance and less impact on visual appearance. In this way, a color lookup table may be generated to be used for encoding dot patterns given a red color clipping channel.

Figure 7B:
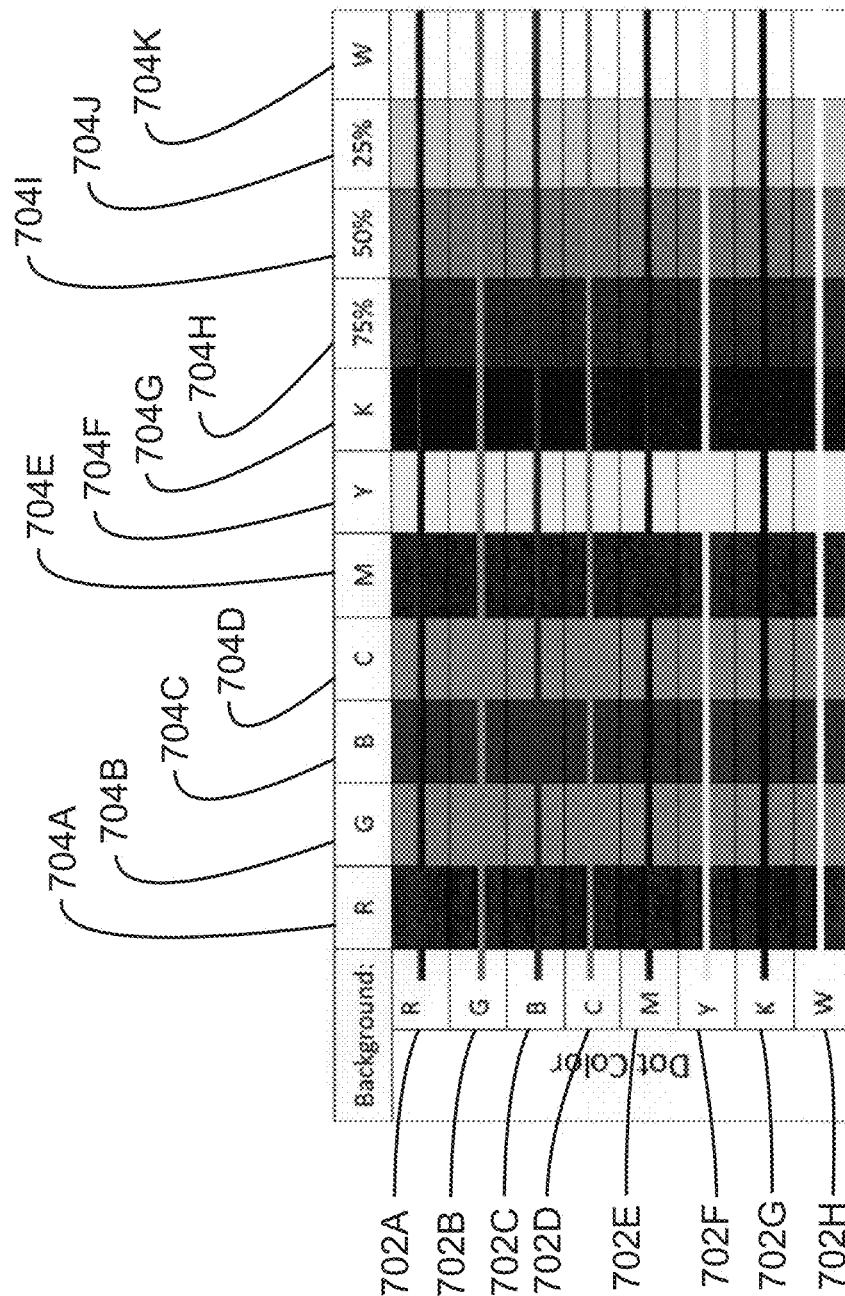
FIG. 7B is a black and white image representing an example green channel of an example scanned printed test chart.

FIG. 7B is a black and white image representing an example green channel of an example scanned printed test chart. The example scanned and printed test chart of FIG. 7B is generally referred to by the reference number 700B and may be used by the computing device 1202 of FIG. 12 below or example machine-readable storage medium 1300 of FIG. 13 below. The test chart may be used to select dot colors to replace background colors given a green clipping channel.

As shown in FIG. 7B, the example test chart 700A includes similarly numbered elements from FIG. 7A above. However, the values of the elements show values of green instead of red. Areas with more green appear lighter than areas with less green.

The example test chart 700B may thus be used to select dot colors given any number of background colors and a green color clipping channel. Given the background color of green 704B, the corresponding dot color that may be selected for maximum detection may be red 702A, blue 702C, magenta 702E, yellow 702F, black 702G, or white 702H. In some examples, the original color scan (not shown) may also be analyzed to choose from red 702A, blue 702C, magenta 702E, yellow 702F, black 702G, or white 702H to select a color that both minimizes visual appearance while maximizing detection performance. The color blue 702C may be chosen as a dot color that has both good detection performance and less impact on visual appearance. In this way, a color lookup table may be generated to be used for encoding dot patterns given a green color clipping channel.

Figure 7C:
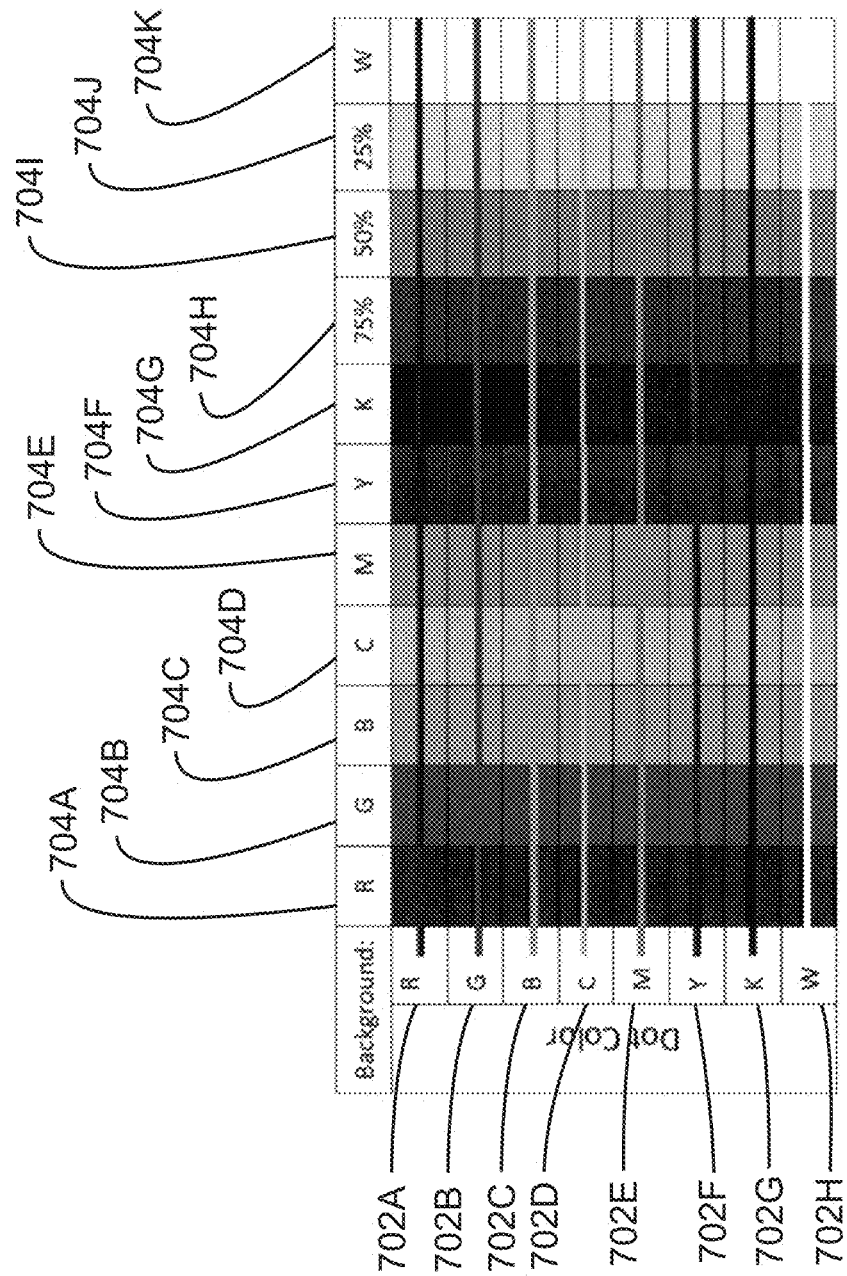
FIG. 7C is a black and white image representing an example blue channel of an example scanned printed test chart.

FIG. 7C is a black and white image representing an example blue channel of an example scanned printed test chart. The example scanned and printed test chart 700C of FIG. 7C may be used by the computing device 1202 of FIG. 12 below or example machine-readable storage medium 1300 of FIG. 13 below. The test chart may be used to select dot colors to replace background colors given a blue clipping channel. The test chart 700C may have been used to generate the lookup table described in FIG. 6 above.

As shown in FIG. 7C, the example test chart 700A includes similarly numbered elements from FIG. 7A above. However, the values of the elements show values of blue instead of red. Areas with more blue appear lighter than areas with less blue.

The example test chart 700C may thus be used to select dot colors given any number of background colors and a green color clipping channel. Given the background color of green 704B, the corresponding dot color that may be selected for maximum detection may be blue 702C, cyan 702D, magenta 702E, or white 702H. In some examples, the original color scan (not shown) may also be analyzed to choose from blue 702C, cyan 702D, magenta 702E, or white 702H to select a color that both minimizes visual appearance while maximizing detection performance. The color cyan 702D may be chosen as a dot color that has both good detection performance and less impact on visual appearance. In this way, a color lookup table may be generated to be used for encoding dot patterns given a green color clipping channel. The generated lookup table may be lookup table 600 of FIG. 6 above. In some examples, one or more dot color—background color combinations may be identified that may be easily distinguished using one of the RGB channels that may be used in a dot pattern recovery system. In some examples, using the set of dot-background combinations that may be easily recovered with one of the color separations, dot-background combinations may then be selected on the test chart where the two colors are visually similar. The selected dot-background combinations may thus be easily recoverable with reduced degradation to the appearance of the underlying document than other dot-background combinations.

Figure 8:
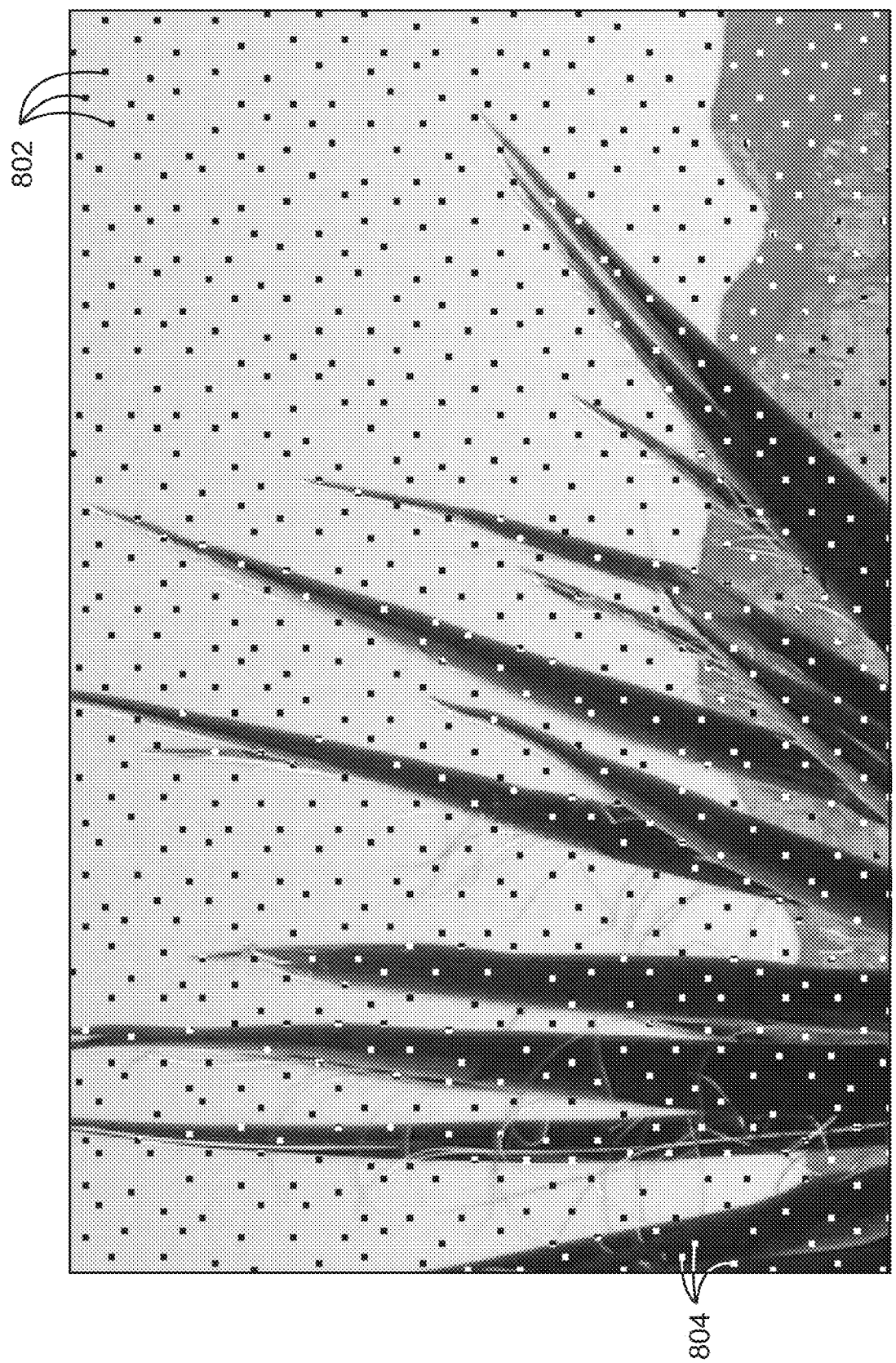
FIG. 8 is a black and white image representing an example blue channel of an example image encoded with a dot pattern.

FIG. 8 is a black and white image representing an example blue channel of an example image encoded with a dot pattern using method 300. In other examples, the image could be of a red channel or a green channel. The example blue channel image 800 of FIG. 8 may be generated by the computing device 1202 of FIG. 12 below or example machine-readable storage medium 1300 of FIG. 13 below. The blue channel image 800 may have been extracted from a color image that was printed with an encoded dot pattern according to techniques described herein and scanned or otherwise image captured.

As shown in FIG. 8, the blue channel clipped image 800 includes darker dots 802 indicating less blue and lighter dots 804 indicating the presence of more blue. In some examples, the blue color value of each of the dots 802 and 804 may have been selected based on a blue pixel value of the source image being replaced. Source image pixels having blue channel values above a threshold may have been assigned darker dots 802 and source image pixels having blue channel values not exceeding the threshold may have been assigned light dots 804. In general, the lighter dots 802 and darker dots 804 are thus easily distinguished across the image 800. By contrast, in the original printed color image (not shown) corresponding to the image 800, the dots 802 and 804 may be difficult to discern and may not be visually intrusive. Thus, using the techniques described herein, a blue clipping channel may be used to detect the dots 802 and 804 and extract information from the dots, without being visually distracting to viewing of the original source image. Because of low visual sensitivity to blue, the blue channel clipping may offer excellent appearance without sacrificing detectability.

Figure 9A:
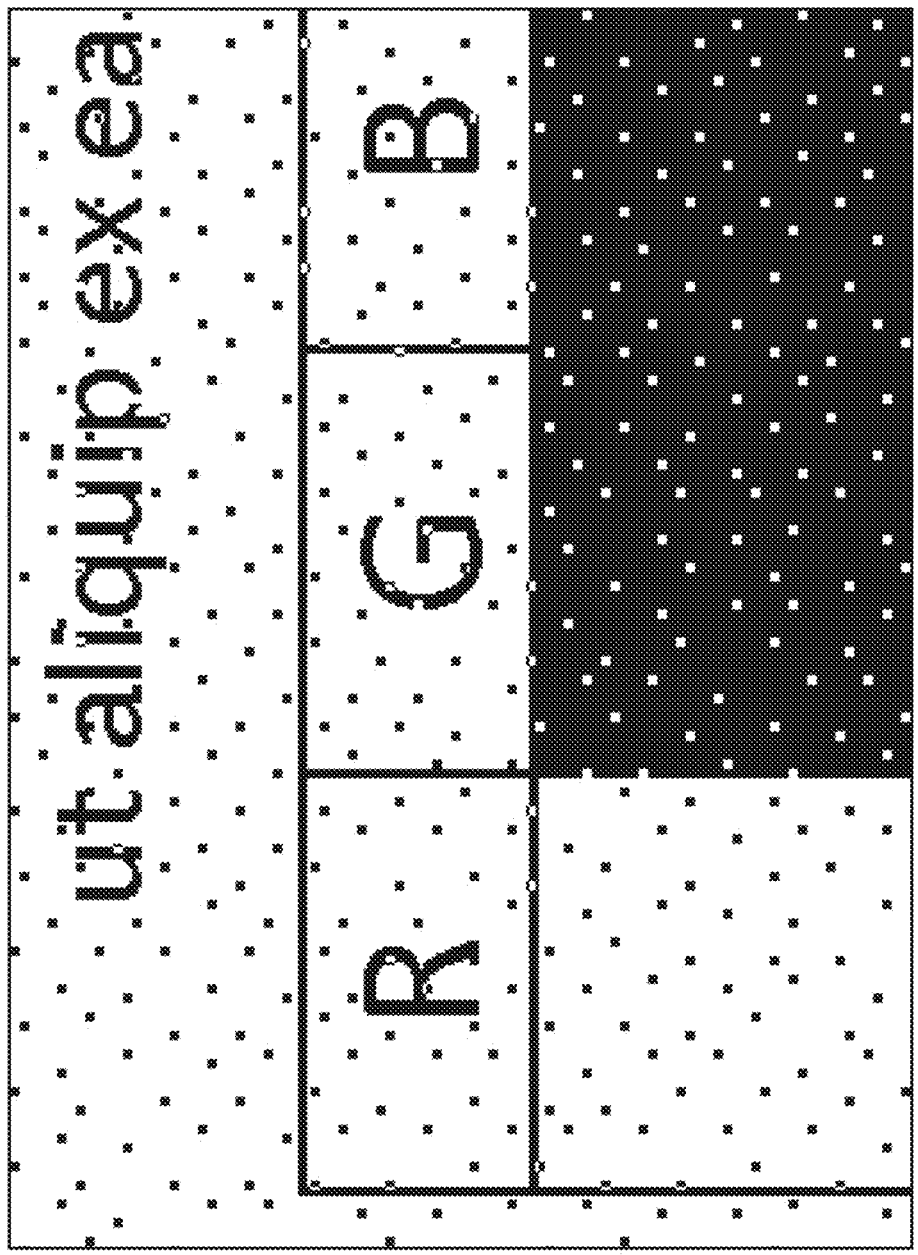
FIG. 9A is a black and white image representing an example red channel of an example printed and scanned image encoded with a dot pattern of multiple colors.

FIG. 9A is a black and white image representing an example red channel of an example printed and scanned image encoded with a dot pattern of multiple colors. The example red channel clipped image 900A of FIG. 9A may be generated by the computing device 1202 of FIG. 12 below or example machine-readable storage medium 1300 of FIG. 13 below. The red channel image 900A may have been a color image that was printed with an encoded dot pattern using three colors according to techniques described herein and scanned or otherwise image captured and clipped based on a red color channel.

As shown in FIG. 9A, the red channel image 900A includes dots that are easily detected across the entire red channel image 900A. Although the dots may be more visually noticeable in the original color image (not shown), the dot pattern in the resulting printed color image may be detected using the red channel in addition to the green and blue channels as shown below in FIGS. 9B and 9C.

Figure 9B:
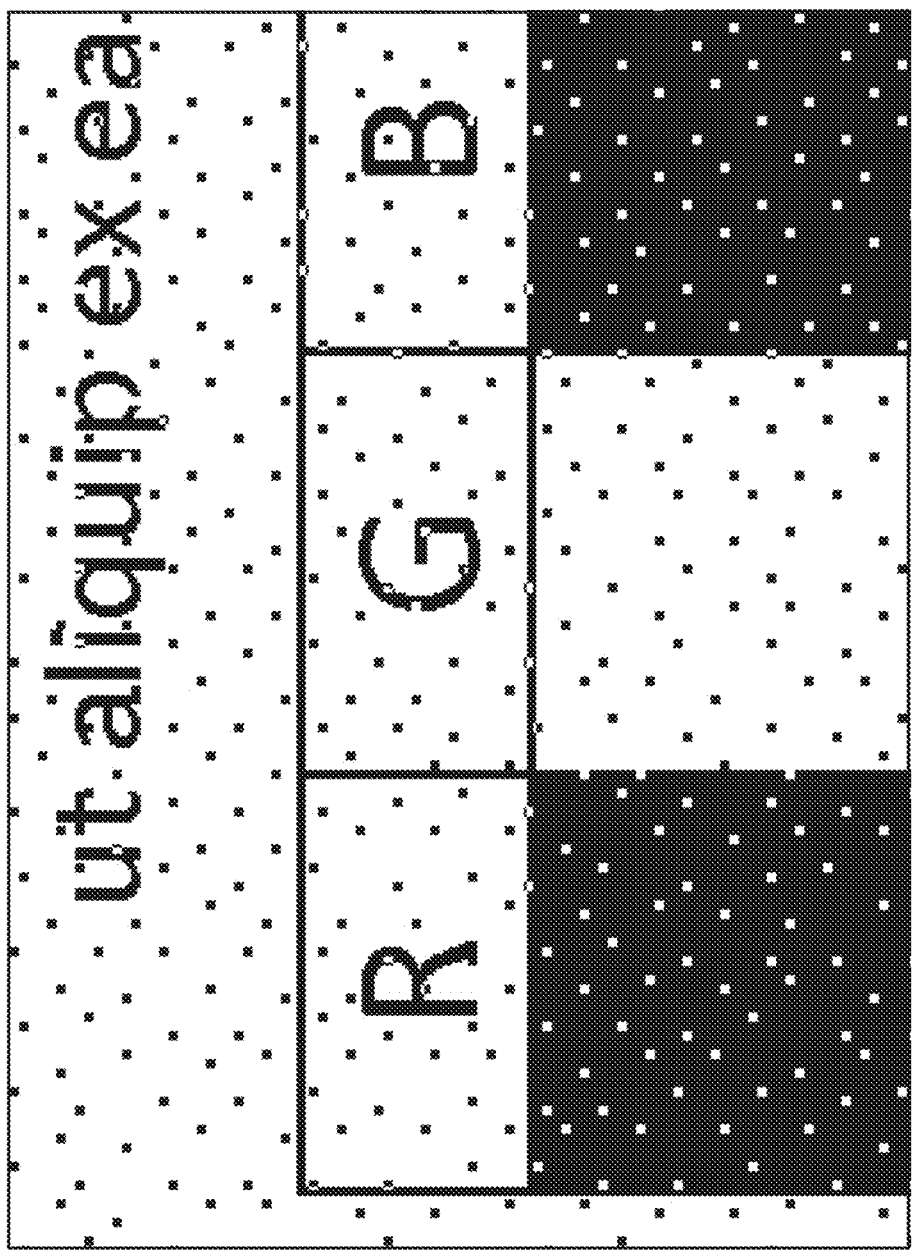
FIG. 9B is a black and white image representing an example green channel of an example printed and scanned image encoded with a dot pattern of multiple colors.

FIG. 9B is a black and white image representing an example green channel of an example printed and scanned image encoded with a dot pattern of multiple colors. The example green channel image 900B of FIG. 9B may be generated by the computing device 1202 of FIG. 12 below or example machine-readable storage medium 1300 of FIG. 13 below. The green channel image 900B may have been a color image that was printed with an encoded dot pattern using three colors according to techniques described herein and scanned or otherwise image captured and clipped based on a green color channel.

As shown in FIG. 9B, the green channel image 900B includes dots that are also easily detected across the entire image 900B. Again, although the dots may be more visually noticeable in the original corresponding color image (not shown), the dot pattern in the resulting printed color image may be detected using the green channel in addition to the red channel described above and blue channel described below as shown below in FIGS. 9A and 9C.

FIG. 9C is a black and white image representing an example blue channel of an example printed and scanned image encoded with a dot pattern of multiple colors. The example blue channel image 900C of FIG. 9C may be generated by the computing device 1202 of FIG. 12 below or example machine-readable storage medium 1300 of FIG. 13 below. The blue channel image 900C may have been a color image that was printed with an encoded dot pattern using three colors according to techniques described herein and scanned or otherwise image captured and clipped based on a blue color channel.

As shown in FIG. 9C, the blue channel image 900C includes dots that are easily detected across the entire image 900C. Again, although the dots may be more visually noticeable in the original corresponding color image (not shown), the dot pattern in the resulting printed color image may be detected using the blue channel in addition to the red and green channels described above in FIGS. 9A and 9B. Thus, an all channel clipping method may be used where high detectability is a priority over visual quality. In this example, the dot pattern is present in all three channels, red, green and blue, which makes correct recovery of the dot pattern very robust at the expense of visual appearance of the original scanned color document (not shown).

Figure 10:
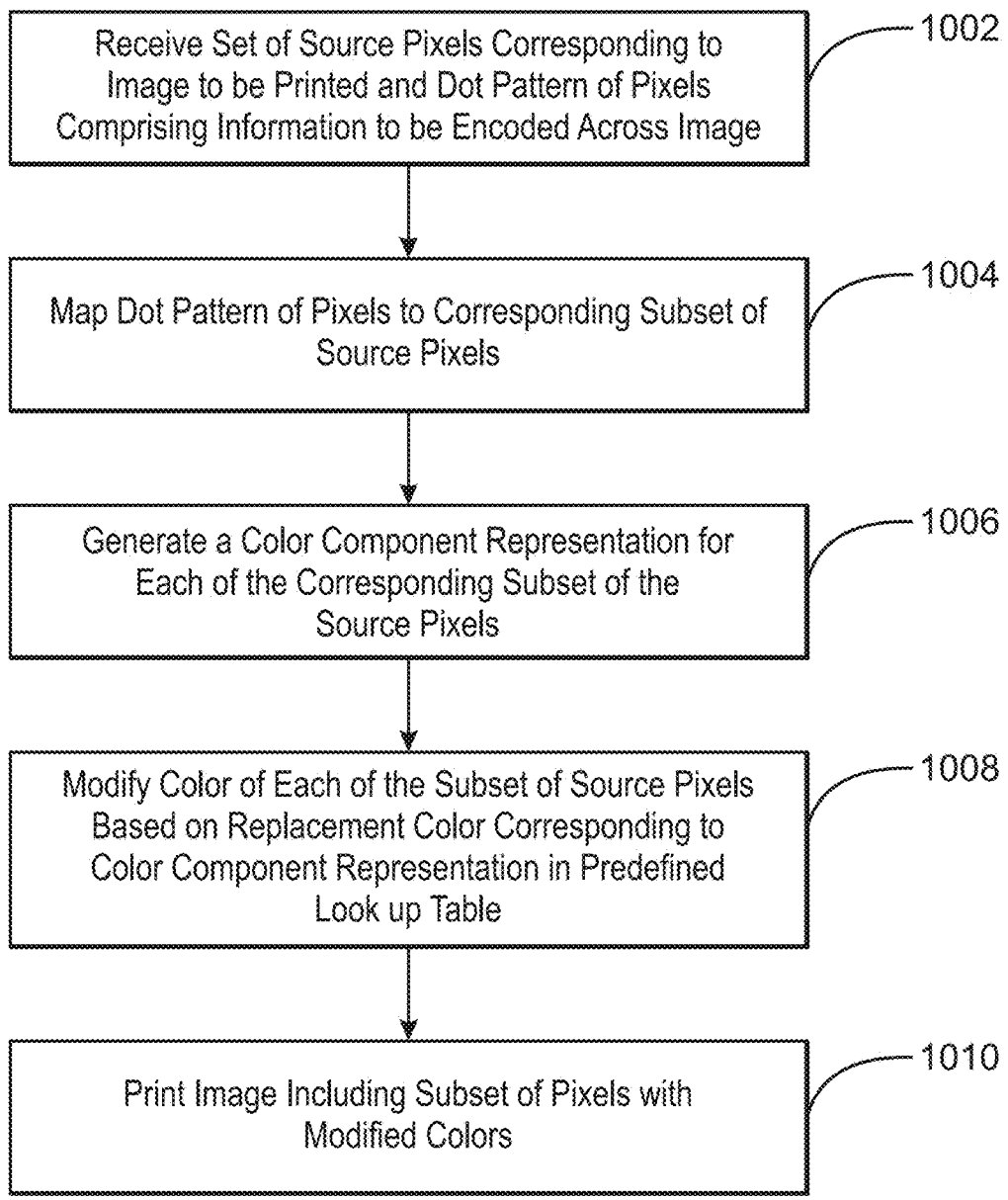
FIG. 10 is a process flow diagram illustrating an example method for encoding and printing images with dot patterns using a lookup table with replacement colors.

FIG. 10 is a process flow diagram illustrating an example method for encoding and printing images with dot patterns using a lookup table with replacement colors. The method 1000 of FIG. 10 may be implemented in the computing device 1202 of FIG. 12 below or example machine-readable storage medium 1300 of FIG. 13 below. The method 1000 may be implemented using processor 1202 or the processor 1302.

At block 1002, a set of source pixels corresponding to an image to be printed and a dot pattern of pixels including information to be encoded across the image are received. The size of the dot pattern of pixels may be the same size as a source document page of the set of source pixels.

At block 1004, the dot pattern of pixels are mapped to a corresponding subset of the source pixels. A source page and a dot pattern image are compared one region, such as a pixel, at a time to match a corresponding subset of source pixels to the dot pattern of pixels.

At block 1006, a color component representation is generated for each of the corresponding subset of the source pixels and modify the color of each of the subset of the source pixels based on a replacement color corresponding to the color component representation in a predefined lookup table. A color component representation may be generated that includes a three-bit index corresponding to most significant bits of red, green, and blue color components of each of the subset of the source pixels, and the predefined lookup table includes replacement colors including cyan, magenta, yellow, and black. In some examples, the predefined lookup table may include a replacement color for each of eight color component representations based on low visibility and high detectability in a color component channel to be used to detect the dot pattern of pixels. The replacement color for each of the eight color components representations may be predefined based on a printed and scanned test chart including candidate replacement colors against various background colors.

At block 1008, the image including the subset of pixels with modified colors is printed. The image may be printed onto any suitable medium, such as a white sheet of paper.

It is to be understood that the process diagram of FIG. 10 is not intended to indicate that all of the elements of the method 1000 are to be included in every case. Further, any number of additional elements not shown in FIG. 10 may be included in the method 1000, depending on the details of the specific implementation.

Figure 11:
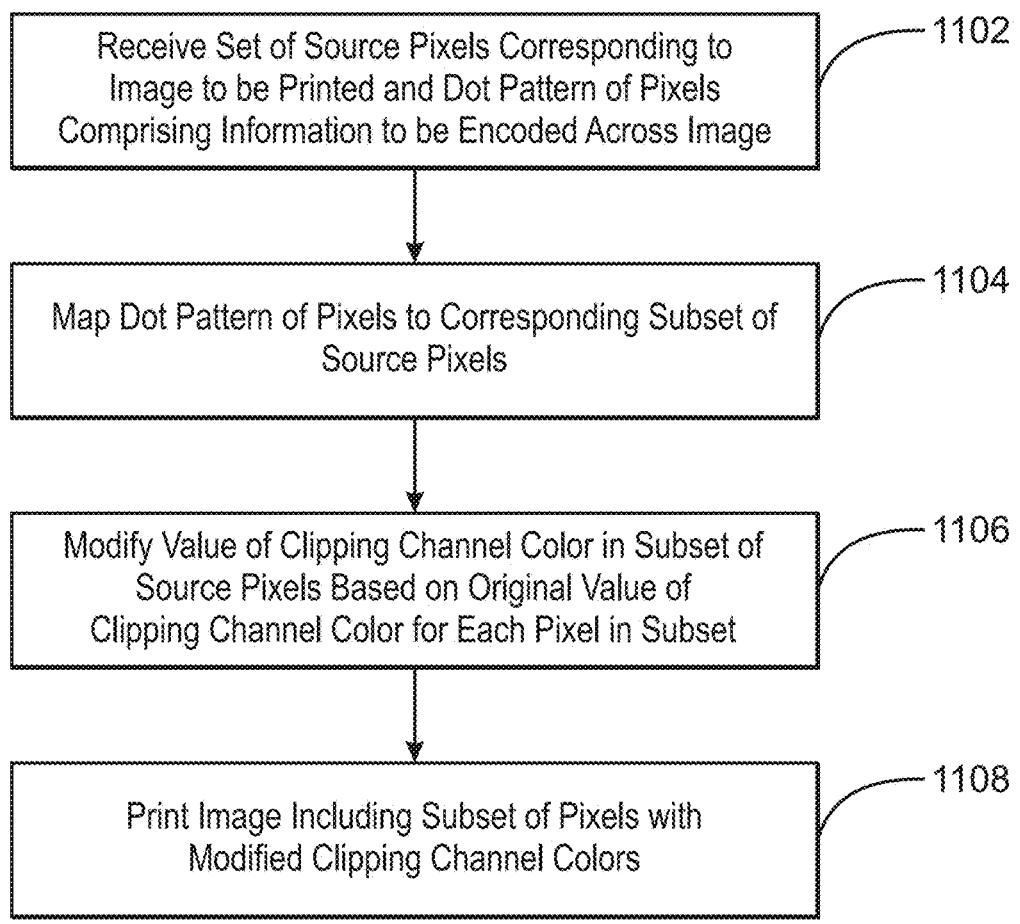
FIG. 11 is a process flow diagram illustrating an example method for encoding and printing images with dot patterns using clipping channel color values.

FIG. 11 is a process flow diagram illustrating an example method for encoding and printing images with dot patterns using clipping channel color values. The method of FIG. 11 is generally referred to by the reference number 1100 and may be implemented in the computing device 1202 of FIG. 12 below or example machine-readable storage medium 1300 of FIG. 13 below. The method may be implemented using processor 1202 or the processor 1302.

At block 1102, a set of source pixels corresponding to an image to be printed is received and a dot pattern of pixels including information to be encoded across the image. The image may be a color image or a document containing both black text and images. In some examples, the information may include printer information, a date, time, who printed it, a transaction code, a document identifier, network statistics, user-driven measurements, among other information. Alternatively, the stored data in the dot pattern can be a linked to a database pointing to this information.

At block 1104, the dot pattern of pixels is mapped to a corresponding subset of the source pixels. For example, a source page and a dot pattern image are compared one region, such as a pixel, at a time to match a corresponding subset of source pixels to the dot pattern of pixels.

At block 1106, a value of a clipping channel color in the subset of the source pixels is modified based on an original value of the clipping channel color for each pixel in the subset. The clipping channel color is used to detect the dot pattern of pixels. The value of the clipping channel color may be set to a maximum value in response to detecting that the original value of the clipping channel color of a pixel in the subset of source pixels is less than a threshold. The value of the clipping channel color may be set to zero in response to detecting that the value of the clipping channel color of a pixel in the subset of source pixels is greater than the threshold. An original value of each pixel in the subset may be converted into a three-bit number including red, green, and blue (RGB) most significant bits (MSBs). The original value of each pixel may be converted into three-bit RGB MSBs using a three dimensional color cube as described in in FIG. 5 above. The value of the clipping channel color may be set to a maximum value in response to detecting that a most significant bit of the original value of the clipping channel color of a pixel in the subset of source pixels is equal to zero. The value of the clipping channel color may be set to zero in response to detecting that the most significant bit of the original value of the clipping channel color of a pixel in the subset of source pixels is equal to one. The value of at least one additional clipping channel color in the subset of source pixels may be modified based on an original value of the at least one additional clipping channel color.

At block 1108, the image including the subset of pixels with modified clipping channel colors is printed. The clipping channel color, the at least one additional clipping channel color, or any combination thereof, may then be used to detect the dot pattern of pixels. The clipping channel may be a red clipping channel, a blue clipping channel, a green clipping channel, or any combination thereof. In some examples, a scanned copy of the printed image may be received. The dot pattern of pixels using the clipping channel color may then be detected. Information from the detected dot pattern of pixels may be extracted from the detected dot pattern.

It is to be understood that the process diagram of FIG. 11 is not intended to indicate that all of the elements of the method 1100 are to be included in every case. Further, any number of additional elements not shown in FIG. 11 may be included in the method 1100, depending on the details of the specific implementation.

Figure 12:
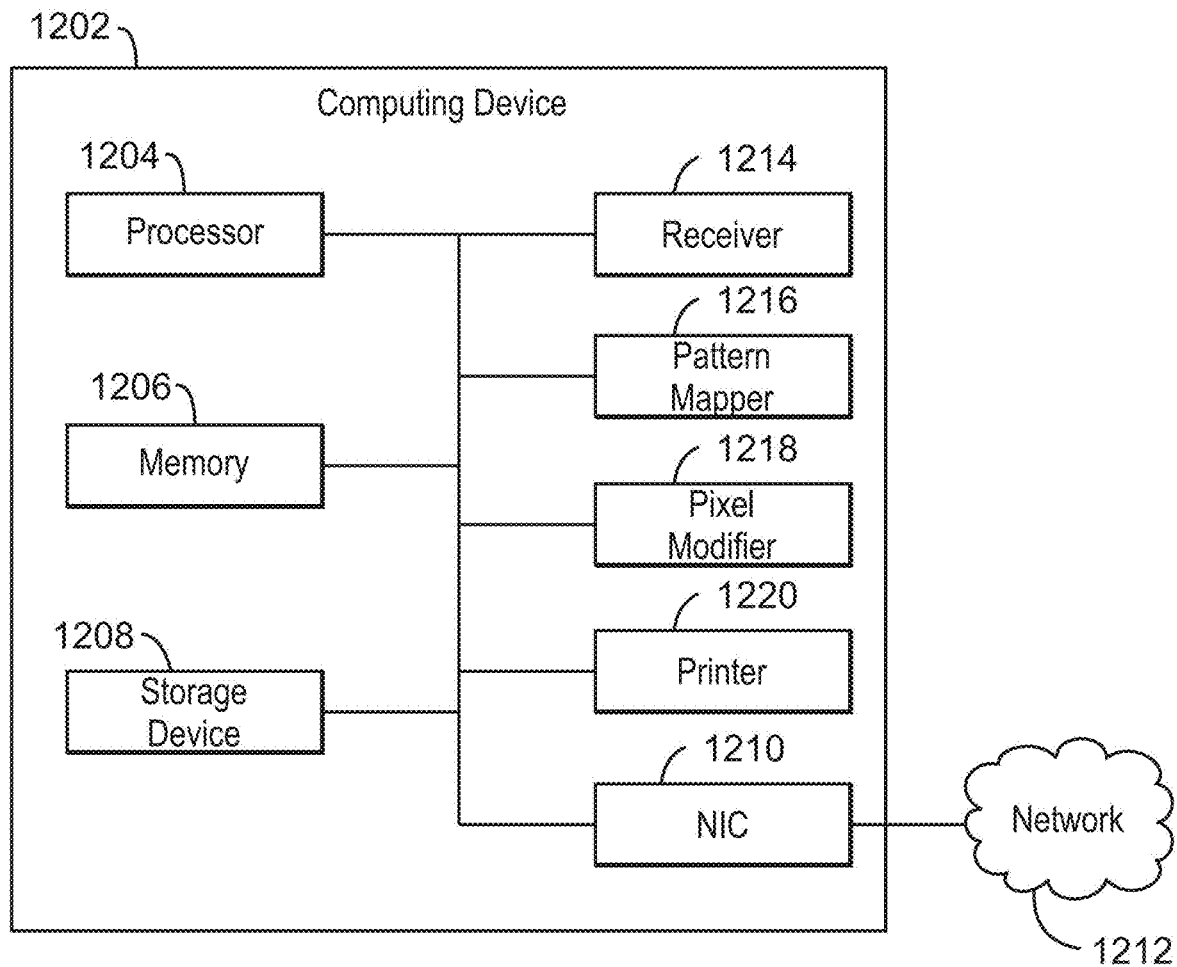
FIG. 12 is block diagram of an example computing device to modify and print images with encoded dot patterns based on source pixel color.

FIG. 12 is a block diagram of an example computing device 1202 to modify and print images with encoded dot patterns based on source pixel color. The computing device 1202 may be a printing device. The computing device 1202 may include a processor 1204, memory 1206, a machine-readable storage 1208, and a network interface 1210 to connect computing system 1202 to network 1212. The network interface 1210 may be a network interface card (NIC).

In some examples, the processor 1204 may be a main processor that is adapted to execute the stored instructions. Moreover, more than one processor 1204 may be employed. The processor 1204 may be a single core processor, a multi-core processor, a computing cluster, or any number of other configurations. The processor 1204 may be implemented as Complex Instruction Set Computer (CISC) or Reduced Instruction Set Computer (RISC) processors, x86 Instruction set compatible processors, ARMv7 Instruction set compatible processors, multi-core, or any other microprocessor or central processing unit (CPU). In some examples, the computing device 1200 may use an ASIC, FPGA or GPU to process video images instead of, or in addition to, the processor 1204.

The memory 1206 may be one or more memory devices. The memory 1206 may be volatile memory or nonvolatile memory. In some examples, the memory 1206 may include random access memory (RAM), cache, read only memory (ROM), flash memory, and other memory systems.

The storage 1208 is machine-readable storage and may include volatile and nonvolatile memory. The machine-readable storage 1208 may be electronic, magnetic, optical, or other physical storage device that stores executable instructions (e.g., code, logic). Thus, the machine-readable storage 1208 medium may be, for example, RAM, an Electrically-Erasable Programmable Read-Only Memory (EEPROM), a storage drive such as a hard drive or solid state drive (SSD), an optical disc, and the like. The storage 1208 may also include storage or memory external to the computing device 1202. Moreover, as described below, the machine-readable storage medium 1208 may be encoded with executable instructions (e.g., executed by the one or more processors 1204) for prioritizing data. For example, the machine-readable storage medium 1208 may be encoded with executable instructions for modifying and printing images with encoded dot patterns based on source pixel color.

A network interface 1210 (e.g., a network interface controller or NIC) may couple the computing system 1202 to a network 1212. For example, the network interface 1210 may connect computing system 1202 to a local network 1212, a virtual private network (VPN), or the Internet. The network interface 1210 may include an Ethernet controller. In some examples, the network may include a database (not shown). For example, the database may include information to be encoded as dot patterns.

The computing device 1202 may also include a receiver 1214, a pattern mapper 1216, a pixel modifier 1218, and a printer 1220. The receiver 1214 may receive a set of source pixels corresponding to an image to be printed and a dot pattern of pixels including information to be encoded across the image. The pattern mapper 1216 may map the dot pattern of pixels to a corresponding subset of the source pixels. The pixel modifier 1218 may generate a color component representation for each of the corresponding subset of the source pixels and modify the color of each of the subset of the source pixels based on a replacement color corresponding to the color component representation in a predefined lookup table. The printer 1220 may print the image including the subset of pixels with modified colors.

The receiver 1214, pattern mapper 1216, pixel modifier 1218, and printer 1220 may be instructions (e.g., code, logic, etc.) stored in the machine-readable storage 1208 and executed by the processor 1204 or other processor to direct the computing device 1200 to implement the aforementioned actions. An application-specific integrated circuit (ASIC) may also be employed. In other words, one or more ASICs may be customized for the aforementioned actions implemented via the receiver 1214, locator 1216, and change detector 1218.

The storage 1208 may include generated lookup tables used to select colors for dot patterns. The storage 1208 may also include one or more dot patterns to be encoded into printed documents.

The block diagram of FIG. 12 is not intended to indicate that the computing device 1202 is to include all of the components shown in FIG. 12. Further, the computing device 1202 may include any number of additional components not shown in FIG. 12, depending on the details of the specific implementation.

Figure 13:
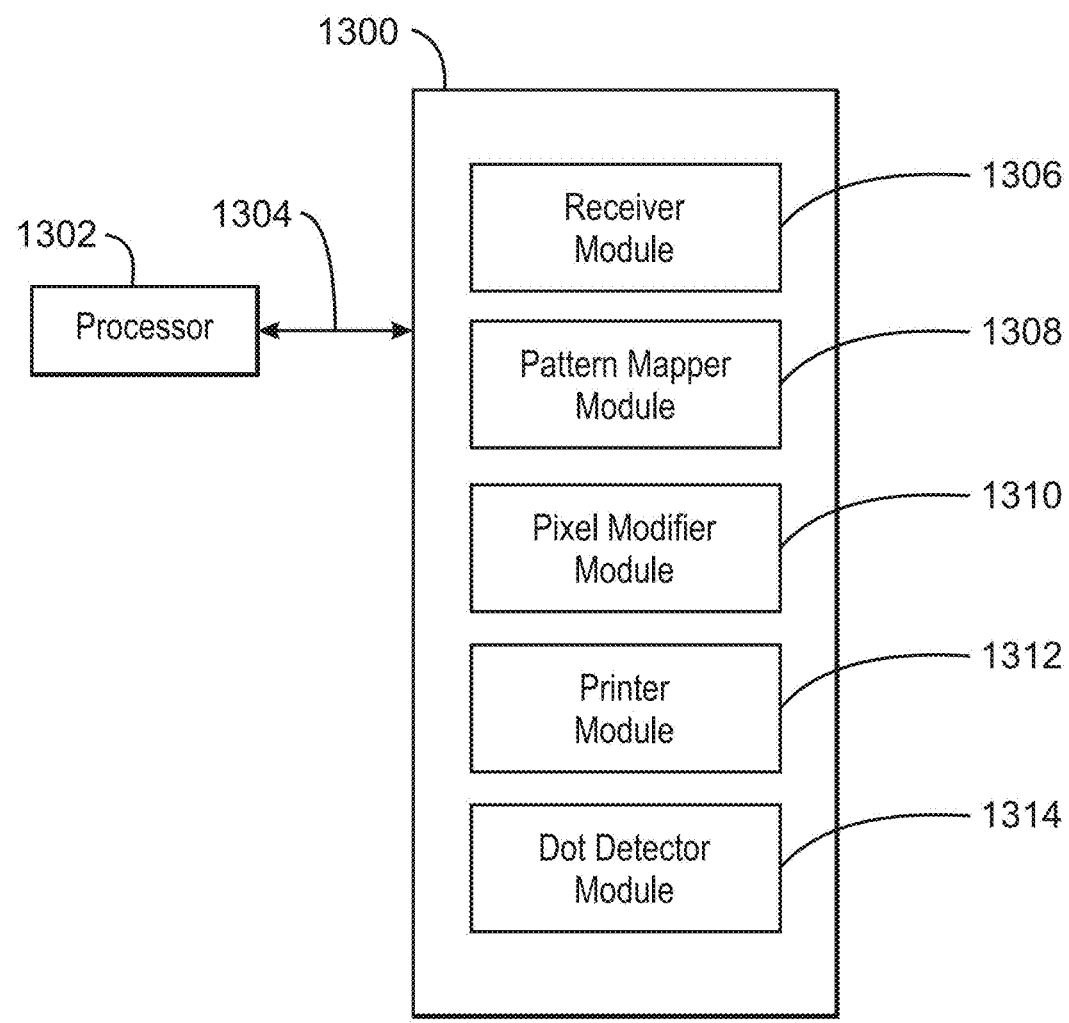
FIG. 13 is a block diagram of an example machine-readable storage medium that can be used to modify and print images with encoded dot patterns based on source pixel color.

FIG. 13 is a block diagram of an example machine-readable storage medium that can be used to modify and print images with encoded dot patterns based on source pixel color. The machine-readable medium is generally referred to by the reference number 1300. The machine-readable medium 1300 may include RAM, a hard disk drive, an array of hard disk drives, an optical drive, an array of optical drives, a non-volatile memory, a flash drive, a digital versatile disk (DVD), or a compact disk (CD), among others. The machine-readable storage medium 1300 may be accessed by a processor 1302 over a bus 1304. The processor 1302 may be a processor of a computing device, such as the processor 1204 of FIG. 12. In some examples, the processor 1302 may be a field-programmable gate array (FPGA) processor and/or an ASIC processor. Furthermore, as indicated, the machine-readable medium 1300 may include code configured to perform the methods and techniques described herein. The various logic components discussed herein may be stored on the machine-readable medium 1300. Portions 1306, 1308, and 1310 of the machine-readable storage medium 1300 may include receiver module code, pattern mapper module code, pixel modifier code, and printer module code, respectively, which may be executable code, or machine readable instructions, that direct a processor or controller in performing the techniques discussed with respect to the preceding figures.

The various logic (e.g., instructions, code) components discussed herein may be stored on the tangible, non-transitory machine-readable medium 1300 as indicated in FIG. 13. For example, the machine-readable medium 1300 may include the receiver module 1306 that, when executed by a processor, directs the processor or a computing device to receive a set of source pixels corresponding to an image to be printed and a dot pattern of pixels including information to be encoded across the image. The machine-readable medium 1300 may also include the pattern mapper module 1308 that, when executed by a processor, directs the processor or a computing device to map the dot pattern of pixels to a corresponding subset of the source pixels. The machine-readable medium 1300 may include the pixel modifier module 1310 that, when executed by a processor, directs the processor or a computing device to modify a value of a clipping channel color in the subset of the source pixels based on an original value of the clipping channel color for each pixel in the subset. The clipping channel color is to be used to detect the dot pattern of pixels. The pixel modifier module 1310 may also direct the processor or a computing device to set the value of the clipping channel color to a maximum value in response to detecting that the original value of the clipping channel color of a pixel in the subset of source pixels is less than a threshold. The pixel modifier module 1310 may also direct the processor or a computing device to set the value of the clipping channel color to zero in response to detecting that the value of the clipping channel color of a pixel in the subset of source pixels is greater than a threshold. The pixel modifier module 1310 may also direct the processor or a computing device to set the value of the clipping channel color to a maximum value in response to detecting that a most significant bit of the original value of the clipping channel color of a pixel in the subset of source pixels is equal to zero. The pixel modifier module 1310 may also direct the processor or a computing device to set the value of the clipping channel color to zero in response to detecting that the most significant bit of the original value of the clipping channel color of a pixel in the subset of source pixels is equal to one. The pixel modifier module 1310 may also direct the processor or a computing device to modify the value of at least one additional clipping channel color in the subset of source pixels based on an original value of the at least one additional clipping channel color. The clipping channel color, the at least one additional clipping channel color, or any combination thereof, may be used to detect the dot pattern of pixels. The machine-readable medium 1300 may include a printer module 1312 that, when executed by a processor, direct the processor or a computing device to print the image including the subset of pixels with modified clipping channel colors. The machine-readable medium 1300 may include a dot detector module 1312 that, when executed by a processor, directs the processor or a computing device to receive a copy of the printed image, detect the dot pattern of pixels using the clipping channel color, and extract information from the detected dot pattern of pixels. Although shown as contiguous blocks, the logic components may be stored in any order or configuration. For example, if the machine-readable medium 1300 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
   receiving a set of source pixels corresponding to an image to be printed and a dot pattern of pixels comprising information to be encoded across the image;
   mapping the dot pattern of pixels to a corresponding subset of the source pixels;
   modifying a value of a clipping channel color in the subset of the source pixels based on an original value of the clipping channel color for each pixel in the subset, wherein the clipping channel color is used to detect the dot pattern of pixels; and
   printing the image comprising the subset of pixels with modified clipping channel colors.

2. The method of claim 1, wherein modifying the value of the clipping channel color comprises setting the value of the clipping channel color to a maximum value in response to detecting that the original value of the clipping channel color of a pixel in the subset of source pixels is less than a threshold or setting the value of the clipping channel color to zero in response to detecting that the value of the clipping channel color of a pixel in the subset of source pixels is greater than the threshold.

3. The method of claim 1, wherein modifying the value of the clipping channel color comprises setting the value of the clipping channel color to a maximum value in response to detecting that a most significant bit of the original value of the clipping channel color of a pixel in the subset of source pixels is equal to zero or setting the value of the clipping channel color to zero in response to detecting that the most significant bit of the original value of the clipping channel color of a pixel in the subset of source pixels is equal to one.

4. The method of claim 1, comprising modifying the value of at least one additional clipping channel color in the subset of source pixels based on an original value of the at least one additional clipping channel color, wherein the clipping channel color, the at least one additional clipping channel color, or any combination thereof, is used to detect the dot pattern of pixels.

5. The method of claim 1, comprising receiving a scanned copy of the printed image, detecting the dot pattern of pixels using the clipping channel color, and extracting information from the detected dot pattern of pixels.

6. The method of claim 1, wherein mapping the dot pattern of pixels to the corresponding subset of the source pixels comprises comparing a source page and a dot pattern image one region, such as one pixel, at a time to match the corresponding subset of the source pixels to the dot pattern of pixels.

7. The method of claim 1, wherein modifying the value of the clipping channel color in the subset of the source pixels based on the original value of the clipping channel color for each pixel in the subset further comprises converting the original value for each pixel in the subset into a three-bit number including red, green, and blue (RGB) most significant bits (MSBs).

8. An apparatus comprising:
   a receiver to receive a set of source pixels corresponding to an image to be printed and a dot pattern of pixels comprising information to be encoded across the image;
   a pattern mapper to map the dot pattern of pixels to a corresponding subset of the source pixels;
   a pixel modifier to generate a color component representation for each of the corresponding subset of the source pixels and modify the color of each of the subset of the source pixels based on a replacement color corresponding to the color component representation in a predefined lookup table; and
   a printer to print the image comprising the subset of pixels with modified colors.

9. The apparatus of claim 8, wherein a size of the dot pattern of pixels is the same size as a source document page of the set of source pixels.

10. The apparatus of claim 8, wherein the color component representation comprises a three bit index corresponding to most significant bits of red, green, and blue color components of each of the subset of the source pixels, and the predefined lookup table comprises replacement colors comprising cyan, magenta, yellow, and black.

11. The apparatus of claim 8, wherein the predefined lookup table comprises a replacement color for each of eight color component representations based on low visibility and high detectability in a color component channel to be used to detect the dot pattern of pixels.

12. The apparatus of claim 11, wherein the replacement color for each of the eight color components representations is predefined based on a printed and scanned test chart comprising candidate replacement colors against various background colors.

13. The apparatus of claim 8, wherein the pattern mapper maps the dot pattern of pixels to the corresponding subset of the source pixels by comparing a source page and a dot pattern image one region, such as one pixel, at a time to match the corresponding subset of the source pixels to the dot pattern of pixels.

14. A non-transitory machine-readable storage medium encoded with instructions executable by a processor, the machine-readable storage medium comprising instructions to:
receive a set of source pixels corresponding to an image to be printed and a dot pattern of pixels comprising information to be encoded across the image;
map the dot pattern of pixels to a corresponding subset of the source pixels;
modify a value of a clipping channel color in the subset of the source pixels based on an original value of the clipping channel color for each pixel in the subset, wherein the clipping channel color is to be used to detect the dot pattern of pixels; and
print the image comprising the subset of pixels with modified clipping channel colors.

15. The non-transitory machine-readable storage medium of claim 14, comprising instructions to set the value of the clipping channel color to a maximum value in response to detecting that the original value of the clipping channel color of a pixel in the subset of source pixels is less than a threshold and set the value of the clipping channel color to zero in response to detecting that the value of the clipping channel color of a pixel in the subset of source pixels is greater than a threshold.

16. The non-transitory machine-readable storage medium of claim 14, comprising instructions to set the value of the clipping channel color to a maximum value in response to detecting that a most significant bit of the original value of the clipping channel color of a pixel in the subset of source pixels is equal to zero and set the value of the clipping channel color to zero in response to detecting that the a most significant bit of the original value of the clipping channel color of a pixel in the subset of source pixels is equal to one.

17. The non-transitory machine-readable storage medium of claim 14, comprising instructions to modify the value of at least one additional clipping channel color in the subset of source pixels based on an original value of the at least one additional clipping channel color, wherein the clipping channel color, the at least one additional clipping channel color, or any combination thereof, is to be used to detect the dot pattern of pixels.

18. The non-transitory machine-readable storage medium of claim 14, comprising instructions to receive a copy of the printed image, detect the dot pattern of pixels using the clipping channel color, and extract information from the detected dot pattern of pixels.

19. The non-transitory machine-readable storage medium of claim 14, wherein the machine-readable storage medium comprises instructions to map the dot pattern of pixels to the corresponding subset of the source pixels by comparing a source page and a dot pattern image one region, such as one pixel, at a time to match the corresponding subset of the source pixels to the dot pattern of pixels.

20. The non-transitory machine-readable storage medium of claim 14, wherein the machine-readable storage medium comprises instructions to modify the value of the clipping channel color in the subset of the source pixels based on the original value of the clipping channel color for each pixel in the subset by converting the original value for each pixel in the subset into a three-bit number including red, green, and blue (RGB) most significant bits (MSBs).

* * * * *